United States Patent
Lee et al.

(10) Patent No.: US 12,436,690 B2
(45) Date of Patent: Oct. 7, 2025

(54) MEMORY CONTROLLER AND STORAGE DEVICE

(71) Applicant: SK hynix Inc., Gyeonggi-do (KR)

(72) Inventors: Hui Won Lee, Gyeonggi-do (KR);
Byung Jun Kim, Gyeonggi-do (KR);
Taek Gyu Lee, Gyeonggi-do (KR);
Young Kyu Jeon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 309 days.

(21) Appl. No.: 17/980,098

(22) Filed: Nov. 3, 2022

(65) Prior Publication Data

US 2023/0134534 A1     May 4, 2023

(30) Foreign Application Priority Data

Nov. 3, 2021 (KR) .......................... 10-2021-0150047
Jul. 13, 2022 (KR) .......................... 10-2022-0086366

(51) Int. Cl.
*G06F 3/06* (2006.01)
*H04L 9/32* (2006.01)

(52) U.S. Cl.
CPC .......... *G06F 3/0622* (2013.01); *G06F 3/0658* (2013.01); *G06F 3/0659* (2013.01); *H04L 9/3242* (2013.01); *G06F 3/0679* (2013.01)

(58) Field of Classification Search
CPC .... G06F 3/0622; G06F 3/0658; G06F 3/0659; G06F 3/0679; G06F 3/0637; G06F 3/0644; G06F 12/1458; G06F 21/78
See application file for complete search history.

(56) References Cited

U.S. PATENT DOCUMENTS

| | | | |
|---|---|---|---|
| 10,868,679 B1 * | 12/2020 | Van Antwerpen | G06F 3/0622 |
| 2008/0112561 A1 * | 5/2008 | Kim | H04L 9/3242 380/42 |
| 2020/0065528 A1 * | 2/2020 | Ogawa | G06F 3/0622 |
| 2021/0051020 A1 * | 2/2021 | Chen | G06F 3/0622 |

(Continued)

FOREIGN PATENT DOCUMENTS

| KR | 10-2019-0099693 A | 8/2019 |
|---|---|---|
| KR | 10-2020-0027982 A | 3/2020 |

OTHER PUBLICATIONS

Kashyap, Hirak, and Ricardo Chaves. "Compact and on-the-fly secure dynamic reconfiguration for volatile FPGAs." ACM Transactions on Reconfigurable Technology and Systems (TRETS) 9.2 (2016): 1-22. (Year: 2016).*

(Continued)

*Primary Examiner* — Nicholas J Simonetti
(74) *Attorney, Agent, or Firm* — IP & T GROUP LLP

(57) ABSTRACT

A memory controller to control a memory device including a secure storage area may include a host interface configured to receive a command from a host, the command including information for authentication requesting access to the secure storage area; a processor configured to generate a device authentication code based on the information for the authentication; and a memory interface configured to access the secure storage area under control of the processor, and the processor may perform at least a portion of an operation of the device authentication code while the host interface or the memory interface receives data, following the command.

20 Claims, 31 Drawing Sheets

(56) References Cited

U.S. PATENT DOCUMENTS

2022/0187997 A1* 6/2022 Chu ..................... G06F 3/0637

OTHER PUBLICATIONS

Stancu, Florin Alexandru, et al. "Trusted industrial Modbus firewall for critical infrastructure systems." 2020 19th RoEduNet conference: networking in education and research (RoEduNet). IEEE, 2020. (Year: 2020).*

Li, He, et al. "Cumulative message authentication codes for resource-constrained IoT networks." IEEE Internet of Things Journal 8.15 (Apr. 2021): 11847-11859. (Year: 2021).*

* cited by examiner

FIG. 5

| | Command PIU | | | |
|---|---|---|---|---|
| Basic Header Segment | 0 Transaction Type | 1 Flags | 2 LUN | 3 Task Tag |
| | 4 Initiator ID \| Command Set Type | 5 Reserved | 6 Reserved | 7 Reserved |
| | 8 Total EHS Length =non-zero | 9 Reserved | 10 (MSB) Data Segment Length | 11 (LSB) |
| Transaction Specific Fields | 12 (MSB) | 13 Expected Data Transfer Length | 14 | 15 (LSB) |
| | 16 CDB[0] | 17 CDB[1] | 18 CDB[2] | 19 CDB[3] |
| | 20 CDB[4] | 21 CDB[5] | 22 CDB[6] | 23 CDB[7] |
| | 24 CDB[8] | 25 CDB[9] | 26 CDB[10] | 27 CDB[11] |
| | 28 CDB[12] | 29 CDB[13] | 30 CDB[14] | 31 CDB[15] |
| Extra Header Segment | k | k+1 Extra Header Segment (EHS) 1 | k+2 | k+3 |
| | j | j+1 Extra Header Segment (EHS) N | j+2 | j+3 |
| | Header E2ECRC (omit if HD=0) | | | |
| Data Segment | Data Segment | | | |
| | Data E2ECRC (omit if DD=0) | | | |

FIG. 6

| | | | | |
|---|---|---|---|---|
| Basic Header Segment | 0<br>Transaction Type | 1<br>Flags | 2<br>LUN | 3<br>Task Tag |
| | 4<br>Initiator ID \| Command Set Type | 5<br>Reserved | 6<br>Reserved | 7<br>Reserved |
| | 8<br>Total EHS Length =non-zero | 9<br>Reserved | 10 (MSB)<br>Data Segment Length | 11 (LSB) |
| Transaction Specific Fields | 12 (MSB) | 13 | 14 | 15 (LSB) |
| | | Residual Transfer Count | | |
| | 16 | 17 | 18 | 19 |
| | | Reserved | | |
| | 20 | 21 | 22 | 23 |
| | | Reserved | | |
| | 24 | 25 | 26 | 27 |
| | | Reserved | | |
| | 28 | 29 | 30 | 31 |
| | | Reserved | | |
| Extra Header Segment | k | k+1 | k+2 | k+3 |
| | | Extra Header Segment (EHS) 1 | | |
| | ⋮ | | | |
| | j | j+1 | j+2 | j+3 |
| | | Extra Header Segment (EHS) N | | |
| | Header E2ECRC (omit if HD=0) | | | |
| Data Segment | k (MSB)<br>Sense Data Length | k+1 (LSB) | k+2<br>Sense Data[0] | k+3<br>Sense Data[1] |
| | ⋮ | ⋮ | ⋮ | ⋮ |
| | k+16<br>Sense Data[14] | k+17<br>Sense Data[15] | k+18<br>Sense Data[16] | k+19<br>Sense Data[17] |
| | Data E2ECRC (omit if DD=0) | | | |

Response PIU

FIG. 9

RPMB Message Components

| Component Name | Length | Request | Response | Description |
|---|---|---|---|---|
| Request Message Type | 2 bytes | Yes | Yes | This component indicates the request message type |
| Response Message Type | 2 bytes | No | Yes | This component indicates the response message type |
| Authentication Key | 32 bytes | Yes | No | This component is used only when programming the Authentication Key |
| MAC | 32 bytes | Yes | Yes | Message Authentication Code |
| Result | 2 bytes | No | Yes | This component provides the operation result |
| Write Counter | 4 bytes | Yes | Yes | Total amount of successful authenticated data write operations |
| Address | 2 bytes | Yes | Yes | Logical block address of data to be programmed to or read from the RPMB region |
| Nonce | 16 bytes | Yes | Yes | Random number generated by the host for the requests and copied to response by the RPMB engine |
| Data | 256 bytes | Yes | Yes | Data to be written or read by signed access |
| Advanced RPMB Data | 4KB | Yes | Yes | Data to be written or read by signed access in advanced RPMB operation |
| Block Count | 2 bytes | Yes | Yes | Number of 256-byte logical blocks requested to be read or programmed |
| Advanced RPMB Block Count | 2 bytes | Yes | Yes | Number of 4Kbytes (advanced RPMB data) requested to be read or programmed |

FIG. 11

RPMB Message of Authenticated Data Write Request

| Offset | Field Name | Value |
|---|---|---|
| 0:195 | Stuff Bytes | 0...00h |
| 196:227 | MAC | MAC from the host |
| 228:483 | Data | Data |
| 484:499 | Nonce | 0...00h |
| 500:503 | Write Counter | Current Counter value |
| 504:505 | Address | Address |
| 506:507 | Block Count | Number of 256B blocks |
| 508:509 | Result | 0000h |
| 510:511 | Request Message Type | 0003h |

AUTHENTICATED DATA: 196:227, 228:483
METADATA: 484:499, 500:503, 504:505, 506:507, 508:509, 510:511

FIG. 12

RPMB Message of Result Read Request

| Offset | Field Name | Value |
|---|---|---|
| 0:195 | Stuff Bytes | 0...00h |
| 196:227 | MAC | 0...00h |
| 228:483 | Data | 0...00h |
| 484:499 | Nonce | 0...00h |
| 500:503 | Write Counter | 0...00h |
| 504:505 | Address | 0000h |
| 506:507 | Block Count | 0000h |
| 508:509 | Result | 0000h |
| 510:511 | Request Message Type | 0005h |

AUTHENTICATED DATA: 196:227, 228:483
METADATA: 484:499, 500:503, 504:505, 506:507, 508:509, 510:511

FIG. 13

RPMB Message of Result Read Response

| Offset | Field Name | Value |
|---|---|---|
| 0:195 | Stuff Bytes | 0...00h |
| 196:227 | MAC | MAC from the storage device |
| 228:483 | Data | 0...00h |
| 484:499 | Nonce | 0...00h |
| 500:503 | Write Counter | New Counter value |
| 504:505 | Address | Address |
| 506:507 | Block Count | 0000h |
| 508:509 | Result | Result Code |
| 510:511 | Response Message Type | 0300h |

AUTHENTICATED DATA: 196:227
METADATA: 484:499 through 510:511

FIG. 17

| | Command PIU | | | | | | |
|---|---|---|---|---|---|---|---|
| 0 Transaction Type | 1 Flags | | 2 LUN | | 3 Task Tag | | |
| 4 Initiator ID / Command Set Type | 5 Reserved | | 6 Reserved | | 7 Reserved | | |
| 8 Total EHS Length(02h) | 9 Reserved | | 10 (MSB) Data Segment Length | | 11 (LSB) | | |
| 12 (MSB) | 13 | | 14 | | 15 (LSB) | | |
| Expected Data Transfer Length | | | | | | | |

| Bit / Byte | 7 | 6 | 5 | 4 | 3 | 2 | 1 | 0 |
|---|---|---|---|---|---|---|---|---|
| 0 | OPERATION CODE (B5h) | | | | | | | |
| 1 | SECURITY PROTOCOL | | | | | | | |
| 2 | SECURITY PROTOCOL SPECIFIC (Region Info) | | | | | | | |
| 3 | | | | | | | | |
| 4 | Reserved | | | | | | | |
| 5 | Reserved | | | | | | | |
| 6 | ALLOCATION LENGTH (RPMB Data Size) | | | | | | | |
| 9 | | | | | | | | |
| 10 | Reserved | | | | | | | |
| 11 | CONTROL=00h | | | | | | | |

| 28 CDB[12]=00h | 29 CDB[13]=00h | 30 CDB[14]=00h | 31 CDB[15]=00h |
|---|---|---|---|

| | | |
|---|---|---|
| 0~3 | EHS Header | |
| 4~5 | Request Message Type – 0003h | ⎫ |
| 6~21 | Nonce – Nonce from the host | |
| 22~25 | Write Counter – Current Counter Value | ⎬ METADATA |
| 26~27 | Address – Address | |
| 28~29 | Advanced RPMB Block Count – Number of Advanced RPMB Data Block | |
| 30~31 | Result – 0000h | ⎭ |
| 32~63 | MAC from the host | } AUTHENTICATED DATA |

EHS field

FIG. 18

| | Response PIU | | | |
|---|---|---|---|---|
| 0 Transaction Type | 1 Flags | 2 LUN | 3 Task Tag | |
| 4 Initiator ID / Command Set Type | 5 Reserved | 6 Reserved | 7 Reserved | |
| 8 Total EHS Length(02h) | 9 Reserved | 10 (MSB) Data Segment Length | 11 (LSB) | |
| 12 (MSB) | 13 | 14 | 15 (LSB) | |
| ⋮ | | | | |

| | | |
|---|---|---|
| 0~3 | EHS Header | |
| 4~5 | Response Message Type - 0300h | |
| 6~21 | Nonce - Copy of Nonce | |
| 22~25 | Write Counter - New Counter Value | METADATA |
| 26~27 | Address - Address | |
| 28~29 | Advanced RPMB Block Count - 0000h | |
| 30~31 | Result - Result Code | |
| 32~63 | MAC from the device | AUTHENTICATED DATA |

EHS field ⟵ rows 22~25, 26~27

FIG. 22

RPMB Message of Authenticated Data Read Request

| | Offset | Field Name | Value |
|---|---|---|---|
| | 0:195 | Stuff Bytes | 0...00h |
| AUTHENTICATED DATA | 196:227 | MAC | 0...00h |
| | 228:483 | Data | 0...00h |
| | 484:499 | Nonce | Nonce from the host |
| | 500:503 | Write Counter | 0...00h |
| METADATA | 504:505 | Address | Address |
| | 506:507 | Block Count | Number of 256B blocks |
| | 508:509 | Result | 0000h |
| | 510:511 | Request Message Type | 0004h |

FIG. 23

RPMB Message of Authenticated Data Read Response

| | Offset | Field Name | Value |
|---|---|---|---|
| | 0:195 | Stuff Bytes | 0...00h |
| AUTHENTICATED DATA | 196:227 | MAC | MAC from the storage device |
| | 228:483 | Data | Data |
| | 484:499 | Nonce | Copy of the Nonce |
| | 500:503 | Write Counter | 0...00h |
| METADATA | 504:505 | Address | Address |
| | 506:507 | Block Count | Number of 256B blocks |
| | 508:509 | Result | Result Code |
| | 510:511 | Response Message Type | 0400h |

FIG. 27

| | Command PIU | | | | | | |
|---|---|---|---|---|---|---|---|
| 0 Transaction Type | 1 Flags | | 2 LUN | | 3 Task Tag | | |
| 4 Initiator ID / Command Set Type | 5 Reserved | | 6 Reserved | | 7 Reserved | | |
| 8 Total EHS Length(02h) | 9 Reserved | | 10 (MSB) Data Segment Length | | 11 (LSB) | | |
| 12 (MSB) | 13 | | 14 | | 15 (LSB) | | |
| Expected Data Transfer Length | | | | | | | |

| Bit / Byte | 7 | 6 | 5 | 4 | 3 | 2 | 1 | 0 |
|---|---|---|---|---|---|---|---|---|
| 0 | OPERATION CODE (A2h) | | | | | | | |
| 1 | SECURITY PROTOCOL | | | | | | | |
| 2 | SECURITY PROTOCOL SPECIFIC (Region Info) | | | | | | | |
| 3 | | | | | | | | |
| 4 | Reserved | | | | | | | |
| 5 | Reserved | | | | | | | |
| 6 | TRANSFER LENGTH | | | | | | | |
| 9 | | | | | | | | |
| 10 | Reserved | | | | | | | |
| 11 | CONTROL=00h | | | | | | | |

EHS field:
| Bytes | Field | |
|---|---|---|
| 0~3 | EHS Header | |
| 4~5 | Request Message Type – 0004h | METADATA |
| 6~21 | Nonce – Nonce from the host | |
| 22~25 | Write Counter – 0...00h | |
| 26~27 | Address – Address | |
| 28~29 | Advanced RPMB Block Count – Number of Advanced RPMB Data Block | |
| 30~31 | Result – 0000h | AUTHENTICATED DATA |
| 32~63 | MAC – 0...00h | |

FIG. 28

| | Response PIU | | | |
|---|---|---|---|---|
| 0 Transaction Type | 1 Flags | 2 LUN | 3 Task Tag | |
| 4 Initiator ID / Command Set Type | 5 Reserved | 6 Reserved | 7 Reserved | |
| 8 Total EHS Length(02h) | 9 Reserved | 10 (MSB) Data Segment Length | 11 (LSB) | |
| 12 (MSB) | 13 | 14 | 15 (LSB) | |
| ⋮ | | | | |

| | | |
|---|---|---|
| | 0~3 | EHS Header |
| | 4~5 | Response Message Type – 0400h |
| | 6~21 | Nonce – Copy of Nonce |
| EHS field | 22~25 | Write Counter – 0...00h |
| | 26~27 | Address – Address |
| | 28~29 | Advanced RPMB Block Count – Number of Advanced RPMB Data Block |
| | 30~31 | Result – Result Code |
| | 32~63 | MAC from the device |

METADATA (22~31)
AUTHENTICATED DATA (32~63)

MEMORY CONTROLLER AND STORAGE DEVICE

CROSS-REFERENCE TO RELATED APPLICATION

The present application claims priority under 35 U.S.C. § 119(a) to Korean patent application number 10-2021-0150047, filed on Nov. 3, 2021, and Korean patent application number 10-2022-0086366, filed on Jul. 13, 2022, in the Korean Intellectual Property Office, the entire disclosures of which are incorporated herein by reference.

BACKGROUND

1. Field of Invention

One or more embodiments described herein relate to an electronic device, and more particularly to a memory controller and a storage device.

2. Description of Related Art

The dissemination and use of various kinds of electronic devices are rapidly increasing. Some of these devices are portable and provide various services, often involving the transmission and reception of data with an external server.

In order to perform these services, electronic devices may include at least one processor and an operating system (OS). The OS may be strategically opened by a major manufacturer and a major supplier, whereas application program interfaces, software development kits, and source files may be open to users.

However, using an open operating system may weaken the security of data of the electronic device. For example, data may be damaged or hacked using various kinds of malicious code. Therefore, various methods have been sought for protecting the data of electronic devices.

SUMMARY

An embodiment of the present disclosure provides a memory controller and a storage device that provide an improved security function.

According to an embodiment of the present disclosure, a memory controller to control a memory device including a secure storage area may include a host interface configured to receive a command from a host, the command including information for authentication requesting access to the secure storage area; a processor configured to generate a device authentication code based on the information for the authentication; and a memory interface configured to access the secure storage area under control of the processor, and the processor may perform at least a portion of an operation of the device authentication code while the host interface or the memory interface receives data, following the command.

According to an embodiment of the present disclosure, a storage device may include a memory device including a secure storage area to store data accessed according to authentication; and a memory controller configured to receive a command requesting to store data in the secure storage area and a command including data to be stored in the secure storage area from a host. The command requesting to store the data in the secure storage area may include information for the authentication, and the memory controller may perform at least a portion of an operation of a device authentication code based on the information for the authentication while receiving the command including the data.

According to an embodiment of the present disclosure, a storage device may include a memory device including a secure storage area to store data accessed according to authentication; and a memory controller configured to receive a command requesting to read data stored in the secure storage area from a host and read the data from the secure storage area in response to the command. The command includes information for the authentication, and the memory controller may perform at least a portion of an operation of a device authentication code based on the information for the authentication while the data is read.

According to an embodiment of the present disclosure, a method for controlling a secured access to a memory device may include receiving, from a host, a command including information for authentication requesting access to a secure storage area in the memory device; generating a device authentication code based on the information for the authentication; and accessing the secure storage area. At least a portion of an operation of the device authentication code may be performed while receiving data, following the command.

According to the present technology, a memory controller and a storage device that provide an improved security function are provided.

BRIEF DESCRIPTION OF THE DRAWINGS

FIG. 5 is a diagram illustrating an example configuration of a command PIU.

FIG. 6 is a diagram illustrating an example configuration of a response PIU.

FIG. 9 is a diagram illustrating an example of a replay protected memory block (RPMB) message.

FIG. 11 is a diagram illustrating an embodiment of an RPMB message provided through operation S1005 of FIG. 10, FIG. 12 is a diagram illustrating an embodiment of the RPMB message provided through operation S1013 of FIG. 10.

FIG. 13 is a diagram illustrating an example of an RPMB message provided through operation S1019 of FIG. 10.

FIG. 17 is a diagram illustrating an example structure of a command PIU transferred in operation S1601 of FIG. 16, FIG. 18 is a diagram illustrating an example structure of a response PIU transferred in operation S1607 of FIG. 16.

FIG. 22 is a diagram illustrating an example of a RPMB message provided through operation S2105 of FIG. 21, FIG. 23 is a diagram illustrating an example of a RPMB message provided through operation S1811 of FIG. 21.

FIG. 27 is a diagram illustrating an example structure of the command PIU transferred in operation S2601 of FIG. 26.

FIG. 28 is a diagram illustrating an example structure of the response PIU transferred in operation S2605 of FIG. 26.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

Figure 1:
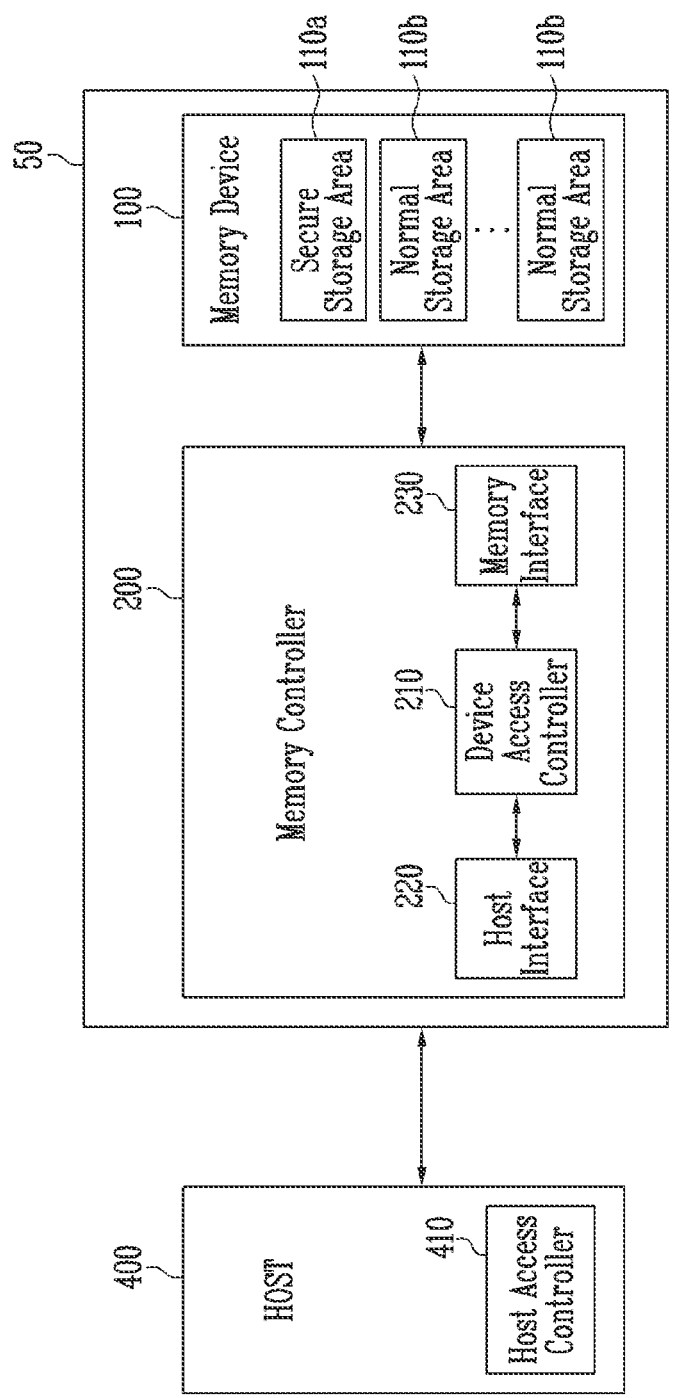
FIG. 1 is a diagram illustrating a storage device according to an embodiment of the present disclosure.

FIG. 1 is a diagram illustrating a storage device according to an embodiment of the present disclosure.

Referring to FIG. the storage device 50 may include a memory device 100 and a memory controller 200, The storage device 50 may be a device that stores data under control of a host 400, such as a cellular phone, a smartphone, an MP3 player, a laptop computer, a desktop computer, a game player, a TV, a tablet PC, or an in-vehicle infotainment system. Alternatively, the storage device 50 may be a device that stores data under the control of the host 400 that stores high-capacity data in one place, such as a server or a data center.

The storage device 50 may be manufactured as one of various types of storage devices according to a host interface that is a communication method with the host 400. Examples of the storage device 50 include an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any one of various types of packages. Examples of the storage device 50 include a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data and may operate under control of the memory controller 200. The memory device 100 may include a memory cell array including a plurality of memory cells that store data. Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits The memory cell array may include a plurality of memory blocks. Each memory block may include a plurality of pages. In an embodiment, a page may be a unit for storing data in the memory device 100 or reading data stored in the memory device 100. The memory block may be a unit for erasing data.

The memory blocks included in the memory device 100 may include a secure storage area 110a (in which access is limited) and a normal storage area 110b. The secure storage area 110a may be an area for storing data which may only be accessible based on authentication. An additional condition or procedure may be further performed to access the secure storage area 110a. For example, access to the secure storage area 110a may be possible only when the storage device 50 receives a predetermined specific command or passes authentication performed by the memory controller 200. An authentication key may be stored in the secure storage area 110a. The authentication key may be a unique key used when the memory controller 200 generates an authentication code for authentication, and may be read-only data after being stored in the secure storage area 110a by the host 400.

In an embodiment, the secure storage area 110a may be a replay protected memory block (RPMB). The normal storage area 110b may be a memory block that may be accessed without separate authentication. The normal storage area 110b may be a memory block that stores data except for the data stored in the secure storage area 110a.

In the present specification, for convenience of description, the secure storage area 110a may be described as the RPMB. However, embodiments of the present disclosure are not limited to an embodiment in which the secure storage area 110a is the RPMB, but rather may be applied to all types of memory blocks of which an access method is different from that of the normal storage area 110b.

In an embodiment, the memory device 100 may be a double data rate synchronous dynamic random access memory (DDR SDRAM), a low power double data rate4 (LPDDR4) SDRAM, a graphics double data rate (DDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, it is assumed that the memory device 100 is a NAND flash memory.

The memory device 100 is configured to receive a command and an address from the memory controller 200 and access an area selected by the address in the memory cell array. The memory device 100 may perform an operation instructed by the command on the area selected by the address. For example, the memory device 100 may perform a write operation (program operation), a read operation, and an erase operation, During the program operation, the memory device 100 may program data in the area selected by the address. During the read operation, the memory device 100 may read data from the area selected by the address. During the erase operation, the memory device 100 may erase data stored in the area selected by the address.

The memory controller 200 may control overall operation of the storage device 50, When power is applied to the storage device 50, the memory controller 200 may execute firmware (e.g., such as a flash translation layer (FTL)) for controlling communication between the host 400 and the memory device 100.

In an embodiment, the memory controller 200 may receive data and a logical block address (LBA) from the host 400 and may convert the LBA into a physical block address (PBA) indicating an address of memory cells in which data included in the memory device 100 is to be stored.

The memory controller 200 may control the memory device 100 to perform a program operation, read operation, or erase operation according to a request of the host 400, During the program operation, the memory controller 200 may provide a program command, PBA, and data to the memory device 100. During the read operation, the memory controller 200 may provide a read command and the PBA to the memory device 100, During the erase operation, the memory controller 200 may provide an erase command and the PBA to the memory device 100.

In an embodiment, the memory controller 200 may generate a command, an address, and data independently regardless of a request from the host 400, and may transmit the command, address, and data to the memory device 100. For example, the memory controller 200 may provide a command, address, and data for performing a program operation, a read operation, and an erase operation accompanying performance of wear leveling, read reclaim, garbage collection, and the like, to the memory device 100.

In an embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100 to overlap with each other.

The memory controller 200 may include a device access controller 210, a host interface 220, and a memory interface 230. The host interface may exchange a command, an address, and data between the memory controller 200 and the host 400, For example, the host interface 220 may receive a request, an address, data, and the like from the host 400, and output data read from the memory device 100 to the host 400. The host interface 220 may communicate with the host 400 using a protocol, such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), load reduced DIMM (LRDIMM), enhanced small disk interface (ESDI), or integrated drive electronics (IDE).

The memory interface 230 may exchange a command, an address, data, and the like between the memory controller 200 and the memory device 100. For example, the memory interface 230 may transmit the command, the address, the data, and the like to the memory device 100 through a channel, and may receive the data and the like from the memory device 100. The memory interface 230 may access the security storage area 110a, such as storing data in the secure storage area 110a in the memory device 100 or reading data from the security storage area, under control of the device access controller 210.

The device access controller 210 may be a kind of processor that controls the host interface 220, the memory interface 230, and the like. For example, the device access controller 210 may control the memory interface 230 to access the secure storage area 110a or the host interface 220 to provide data and the like to the host 400. In addition, the device access controller 210 may deter line whether to access the secure storage area 110a or generate information used to determine whether to access the secure storage area 110a. In an embodiment, the device access controller 210 may perform authentication for accessing the secure storage area 110a or may generate an authentication code for performing authentication. The authentication code may be operated using information for authentication received from the host 400, data to be stored in the memory device 100 or data read from the memory device 100, and an authentication key stored in the secure storage area 110a.

In one embodiment, the host interface 220 may receive a command requesting access to the secure storage area 110a from the host 400. Such a command may include information for performing authentication. In an embodiment, when the secure storage area 110a is an RPMB, the information for performing authentication received through the command may be metadata included in the RPMB message from the host.

When the host interface 220 receives such a command, the device access controller 210 may start operation of the authentication code using the information for the authentication included in the command and the authentication key stored in the secure storage area 110a. At this time, the host interface 220 or the memory interface 230 may perform at least a portion of the operation of the authentication code while receiving data from the host 400 or the secure storage area 110a. For example, when the command requests to store data in the secure storage area 110a, the host interface 220 may receive data to be stored in the secure storage area 110a from the host 400 following the command. In one embodiment, when the command requests to read data from the secure storage area 110a, the memory interface 230 may read data from the secure storage area 110a in response to the command. For example, the memory controller 200 may receive data after receiving the command requesting the access to the secure storage area 110a from the host, and the device access controller 210 in the memory controller 200 may perform at least a portion of the operation of the authentication code using the information for the authentication and the authentication key while receiving data. For example, the operation may be started before data reception and the operation may be continuously performed during data reception, or the operation may be started during data reception.

However, in order to complete the operation of the authentication code, data received from the host 400 or the secure storage area 110a may be used. Accordingly, the device access controller 210 firstly may operate the authentication code using the information for authentication and the authentication key, and then further operate received data on the firstly operated authentication code while receiving the data or after receiving the data, to complete the operation of the authentication code. For example, according to an embodiment of the present disclosure the memory controller may firstly operate the operation code using only the information for authentication and the authentication key before or during data reception. Then, the memory controller may additionally operate the firstly operated authentication code using data upon receiving the data. Therefore, a time for generating the authentication code may be further reduced. In addition, when data is received through a plurality of data packets, a portion of operation of the authentication code may be further performed using data included in a data packet received before the data packet which is being received. Examples are described with reference to FIGS. 16 to 20 and 26 to 30.

For example, when the secure storage area 110a is an RPMB, the device access controller 210 may process an authenticated data write operation of storing data in the RPMB and an authenticated data read operation of reading data stored in the RPMB. Examples of methods for the device access controller 210 to process the authenticated data write operation and the authenticated data read operation are described with reference to FIGS. 16 to 20 and 26 to 30.

The host 400 may communicate with the storage device 50 using at least one of various communication methods, Examples include a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

In one embodiment, the storage device 50 and the host 400 may perform data communication according to an UFS communication interface, but embodiments of the present disclosure are not limited to performing the data communication according to the UFS communication interface. For example, the storage device 50 and the host 400 may perform the data communication using a command defined as a protocol information unit (PIU). A PIU may be a kind of data packet generated according to a predetermined protocol. Therefore, in accordance with one or more embodiments, a PIU is only a form of the command transmitted and received between the storage device 50 and the host 400, and thus the command and the PIU may be the same meaning.

The command may include a request, instruction, or response from the host 400 or the storage device 50 for performing any operation. In an embodiment, various commands may be defined according to use and purpose. For example, all of a query request, command, response, data out, data in, and ready to transfer may be referred to as commands. In one embodiment, the commands may be transmitted in the form of a PIU as described above.

The size of the smallest unit of the PIU may be of a predetermined length (e.g., 32 bytes), and a maximum size of the PIU may be of another predetermined length, e.g., 65,600 bytes. The format of the PIU may have different sizes, for example, according to a type thereof.

The host 400 may provide the command regarding the secure storage area 110a to the storage device 50. The command may be, for example, a command requesting access to the secure storage area 110a. In one embodiment, the command regarding the secure storage area 110a may include a common segment commonly included in commands transmitted and received between a host and the memory controller, a unique field including a unique value according to a type of the commands, and an extra segment which is a segment except for the common segment. The common segment may include, for example, information indicating a length of the extra segment.

At this time, the extra segment may include information for authentication. Thus, the information indicating the length of the extra segment may indicate that the length of the extra segment is non-zero by including a non-zero value.

When the command is provided in the form of the PIU, the command regarding the secure storage area 110a (e.g., the command requesting access to the secure storage area 110a) may be provided in the form of a command PIU, For example, the common segment may be a basic header segment, the unique field may be a transaction specific field, and the extra segment may be an extra header segment. In addition, the basic header segment may include a total extra header segment length field including length information of the extra header segment. Examples are described with reference to FIGS. 3 to 6.

The host 400 may further include a host access controller 410. The host access controller 410 may generate commands for controlling the secure storage area 110a. The commands may be provided to the host interface 220. The host access controller 410 may receive a command from the host interface 220.

Figure 2:
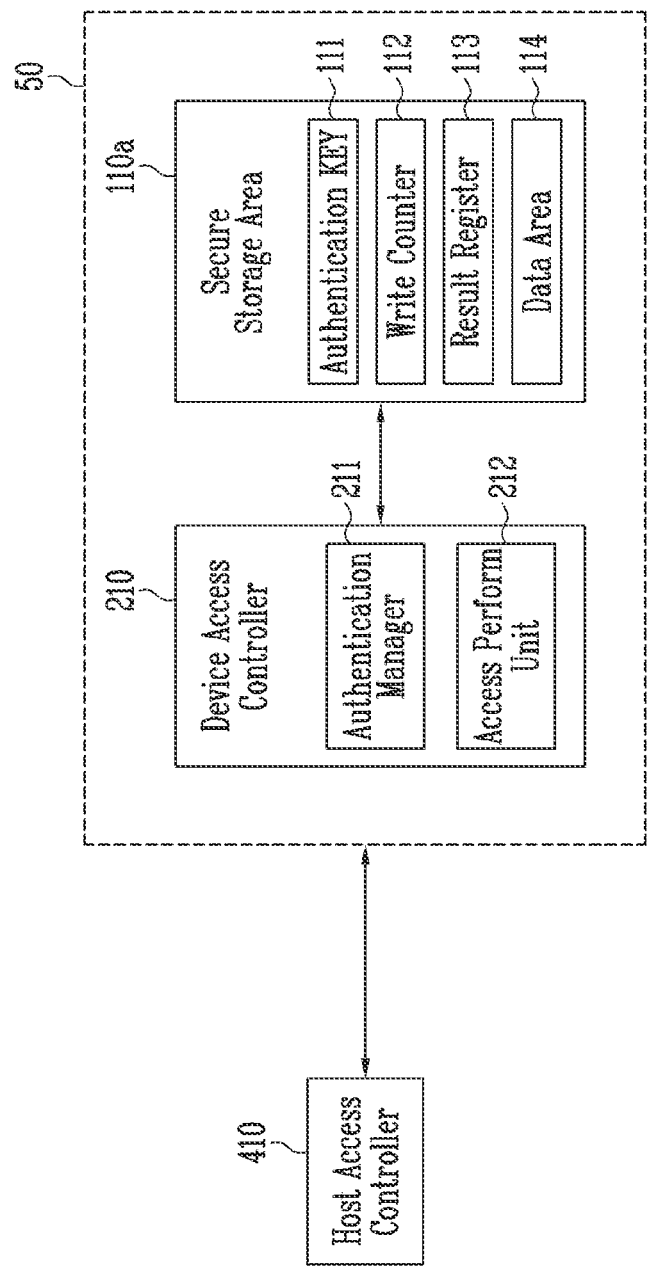
FIG. 2 is a diagram illustrating a storage device according to an embodiment of the present disclosure.

FIG. 2 is a diagram illustrating a storage device according to an embodiment of the present disclosure. Hereinafter, as an embodiment of the present disclosure, in FIGS. 2 to 30, a case where the secure storage area 110a is the RPMB may be disclosed, but an embodiment of the present disclosure is not limited thereto. The secure storage area may be various types of memory blocks in which access is limited.

In addition, as an embodiment of the present disclosure, in FIGS. 2 to 30, the command transmitted and received between the storage device 50 and the host 400 is transmitted in the form of the PIU, but other embodiments of the present disclosure are not limited thereto. Various communication methods may be adopted.

Referring to FIGS. 1 and 2, the storage device 50 may include the secure storage area 110a and the device access controller 210. The secure storage area 110a may be at least a portion of the storage area included in the memory device 100 described with reference to FIG. 1. In an embodiment, the secure storage area 110a may be the RPM B. The device access controller 210 may be included in the memory controller 200, and the host access controller 410 may be included in the host 400.

The secure storage area 110a may include an authentication key 111, a write counter 112, a result register 113, and a data area 114. The authentication key 111 may be a value stored in advance in the secure storage area 110a to be used during authentication for the access to the secure storage area 110a. For example, when the secure storage area 110a is the RPMB, the authentication key 111 may be stored only once for the first time, may not be read by itself, and access may be possible only when calculating a message authentication code (MAC) used to authenticate access to the RPMB, In an embodiment, the authentication key 111 may have a predetermined size (e.g., 32 bytes), but a size of the authentication key is not limited to 32 bytes.

The write counter 112 may count the number of times access to the secure storage area 110a is performed. In one embodiment, access to the secure storage area 110a may be allowed only within a preset number of times, and thus security may be improved. In an embodiment, when the secure storage area 110a is the RPMB, the write counter 112 may count the number of times the authenticated data write operation (e.g., which is an operation of storing data in the RPMB) is successfully performed. A value indicated by the write counter 112 or a value stored in the write counter 112 may be a write count value. The write counter 112 may store a write count value corresponding to a predetermined (e.g., 4) number of bytes, but may also store a write count value corresponding to data of a larger size. An initial write count value may be "0000 0000h". The write count value of the write counter 112 may not be reset or decreased. The write count value of the write counter 112 may not increase any more after reaching a maximum value of "FFFF FFFFh". Therefore, when the write count value of the write counter 112 reaches the maximum value, data may not be stored in the secure storage area 110a anymore, and the secure storage area 110a may operate as a storage area on which only read is possible.

The result register 113 may store a result of an operation performed on the secure storage area 110a, For example, when the secure storage area 110a is the RPMB, the result register 113 may store a result code indicating a result of an operation performed on the RPMB. An example of the result code stored in the result register is shown in Table 1.

TABLE 1

| Code | Description |
|---|---|
| 0000h (0080h) | Operation OK |
| 0000h (0081h) | General failure |
| 0000h (0082h) | Authentication failure* MAC comparison not matching, MAC calculation failure |
| 0000h (0083h) | Counter failure* Counters not matching in comparison, counter incrementing failure |

TABLE 1-continued

| Code | Description |
|---|---|
| 0000h (0084h) | Address failure* Address out of range, wrong address alignment |
| 0000h (0085h) | Write failure* Data/Counter/Result write failure |
| 0000h (0086h) | Read failure* Data/Counter/Result read failure |
| 0007h | Authentication Key not yet programmed.* This value is the only valid Result value until the Authentication Key has been programmed. Once the key is programmed, this value will no longer be used. |
| 0008h (0088h) | Secure Write Protect Configuration Block access failure* Secure Write Protect Configuration read or write failure |
| 0009h (0089h) | Invalid Secure Write Protect Block Configuration parameter* Invalid LUN or logical unit not enabled, DATA LENGTH, LOGICAL BLOCKADDRESS, NUMBER OF LOGICAL BLOCKS, or overlapped areas |
| 000Ah (008Ah) | Secure Write Protection not applicable* Logical unit configured with other write protection modes (permanent or power-on) |

In an embodiment, the authentication key 111, the write counter 112, and the result register 113 may be independently included for each distinct area in the secure storage area 110a, and may have a unique value. In various embodiments, the secure storage area 110a may be partitioned into a plurality of secure storage sub-areas. In an embodiment, when the secure storage area 110a is the RPMB, a maximum number of RPMB sub-areas included in the RPMB may be a predetermined number, e.g., four. Each RPMB sub-area may have a unique authentication key and a write count value. The data area may be an area in which data is stored only when the authentication is passed. In an embodiment, when the secure storage area 110a the RPMB, a capacity of the data area (RPMB Data Area) may be a minimum of a certain number of bytes (e.g., 128 Kbytes) and a maximum of, for example, 16 Mbytes.

The device access controller 210 may further include an authentication manager 211 and an access perform unit 212. When a write operation on the secure storage area 110a is performed, the host access controller 410 may provide a message regarding a write request for the secure storage area 110a to the device access controller 210 according to a predetermined format. Such a message may include, for example, information indicating the write request for the secure storage area 110a, metadata for authentication, authenticated data for the authentication, and the like. For example, when the secure storage area 110a is the RPMB, when the authenticated data write operation is performed, the host access controller 410 may provide an RPMB message to the device access controller 210 according to the predetermined format. The RPMB message provided by the host access controller 410 may include information to perform authentication for the RPMB. For example, the RPMB message may include metadata to perform authentication and authenticated data to perform authentication. The authenticated data may include the MAC generated by the host access controller 410.

The authentication manager 211 may start an operation of a device MAC using the authentication key 111 stored in the secure storage area 110a and the metadata in the message related to the access to the secure storage area 110a received from the host access controller 410. At least a portion of the operation of the device MAC may be performed while data to be stored in the secure storage area 110a is received from the host access controller 410. The operation of the device MAC may be completed by further using the received data. The authentication manager 211 may perform the authentication by comparing the device MAC (of which the operation is completed) with a host MAC generated by the host access controller 410. The authentication manager 211 may provide a result of performing the authentication to the access perform unit 212. The access perform unit 212 may store data in the secure storage area 110a or prohibit data from being stored in the secure storage area 110a according to the result of performing the authentication.

When the authentication is passed, the access perform unit 212 may control the secure storage area 110a to store the data, which is to be stored in the secure storage area 110a received from the host 400, in the data area 114. When the data is successfully stored, the access perform unit 212 may increase the write count value stored in the write counter 112, and store a result of performing the authenticated data write operation in the result register 113. In addition, the access perform unit 212 may operate a response MAC to be provided to the host while data is stored in the data area 114. In addition, when all data is stored in the data area 114, the access perform unit 212 may provide a response including the response MAC to the host access controller 410.

When the authentication fails, the access perform unit 212 may not store the data requested to be stored in the secure storage area 110a in the data area 114. The access perform unit 212 may maintain the value of the write counter 112 and store information indicating that the authentication has failed in the result register 113.

When performing a read operation on the secure storage area 110a, the host access controller 410 may provide a message related to a read request for the secure storage area 110a to the device access controller 210 according to a predetermined format. For example, when the secure storage area 110a is the RPMB, when performing an authenticated data read operation, the host access controller 410 may transmit an RPMB message to the device access controller 210 according to a predetermined format.

The access perform unit 212 may read the data stored in the secure storage area 110a and generate a message related to a read result for the secure storage area 110a to be provided to the host access controller 410. The access perform unit 212 may generate metadata to be included in the message related to the read result for the secure storage area 110a, For example, when the secure storage area 110a is the RPM B, the metadata may include a portion of information included in the RPMB message received from the host access controller 410, data read from the RPMB, and a result code indicating a result of performing the authenticated data read operation. In an embodiment, the access perform unit 212 may start operation of the device MAC, which is authenticated data, using the authentication key 111 stored in the secure storage area 110a and the metadata. At least a portion of the operation of the device MAC may be performed while the data is read from the secure storage area 110a, and operation of the device MAC may be completed by further using the read data.

When operation of the device MAC is completed, the access perform unit 212 may provide the read data to the host access controller 410. While providing the read data to the host access controller 410, at the same time, the access perform unit 212 may generate a message related to the read result for the secure storage area 110a including the device MAC and the metadata. After the access perform unit 212 provides all read data to the host access controller 410, a response including the message related to the read result for the secure storage area 110a may be provided to the host access controller 410, FIG. 3 is a diagram illustrating an embodiment of a data communication unit between the host access controller and the device access controller.

Figures 3, 4:
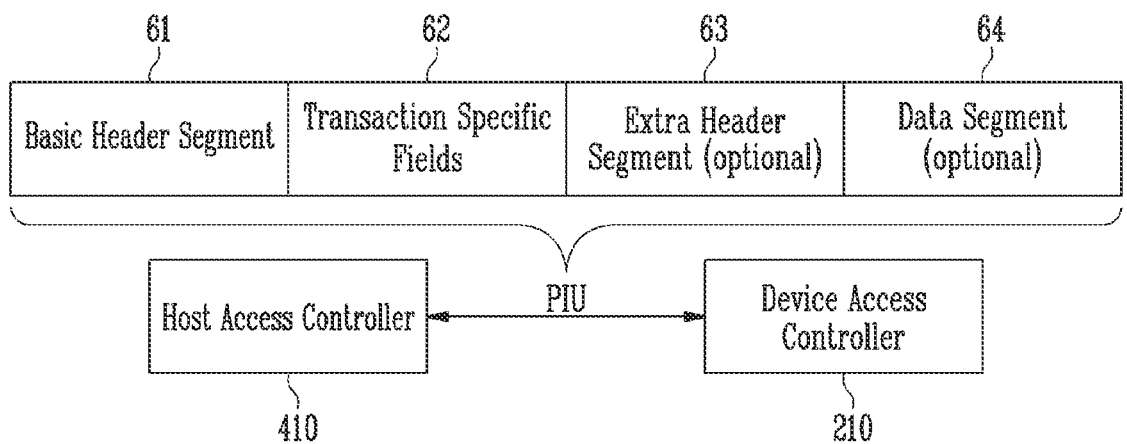
FIG. 3 is a diagram illustrating a data communication unit between a host access controller and a device access controller.
FIG. 4 is a diagram illustrating an example structure of a basic header segment of a protocol information unit (PIU).

Referring to FIGS. 1 and 3, the host access controller 410 and the device access controller 210 may communicate using data packets, referred to as a protocol information unit (PIU). In terms of a physical device, the host access controller 410 is included in the host 400, and the device access controller 210 is included in the storage device 50. In terms of interfacing between two devices, one device may transmit the PIU to the other device. In this case, a device that generates the PIU may be referred to as an initiator device, and a device that receives the generated PIU may be referred to as a target device. For example, the PIU may be a data packet transmitted between two devices rather than a data packet unilaterally transmitted by one device of the host 400 or the storage device 50 to the other device.

The PIU may include a query request PIU, a command PIU, a response PIU, a data out PIU, a data in PIU, and a ready to transfer PIU according to an operation to be performed by the host access controller 410 or the device access controller 210.

The query request PIU may provide a device descriptor that provides various parameters of the storage device 50 to the storage device 50. The query request PIU may include an RPMB unit descriptor. The RPMB unit descriptor may include information indicating whether an advanced RPMB mode of the storage device 50 is activated. For example, the RPMB unit descriptor may include an 8 bit of RPMB region enable field bRPMBRegionEnable setting RPMB regions included in the RPMB. Information on whether the storage device 50 currently supports access to the RPMB in the normal RPMB mode or the storage device 50 currently supports access to the RPMB in the advanced RPMB mode may be included in the RPMB region enable field bRPMBRegionEnable.

The command PIU may be a PIU transmitted when the host 400 transfers a command to the storage device 50.

The response PIU may be a PIU transferred when the storage device 50 provides a response to the command provided by the host 400.

The data out PIU may be a PIU transmitted when the host 400 provides data to the storage device 50.

The data in PIU may be a PIU transmitted when the storage device 50 provides data to the host 400.

The ready to transfer PIU may be a PIU transmitted when the storage device 50 informs that the storage device 50 is ready to receive the data out PIU from the host 400. The ready to transfer PIU may be transmitted when the storage device 50 has a sufficient buffer space to store data provided by the host 400.

The size of the smallest PIU may be a predetermined size (e.g., 32 bytes) and a maximum size of the PIU may be another predetermined size (e.g., 65600 bytes), The format of the PIU may have different sizes, for example, according to a type thereof.

In an embodiment, the PIU may include a basic header segment 61, a transaction specific field 62, an extra header segment 63, and a data segment 64. The basic header segment 61 may have a size, for example, of 12 bytes. The basic header segment 61 may be commonly included in all PIUs. The basic header segment 61 may include basic setting information related to the PIU.

The transaction specific field 62 may be included in a byte address 31 from a byte address 12 of the PIU. The transaction specific field 62 may include a dedicated transaction code according to the type of the PIU.

The extra header segment 63 may be defined when a total extra header length (Total EHS Length) field of the basic header segment 61 has a non-zero value. The extra header segment 63 may start from a byte address 32 of the PIU. The extra header segment 63 may be an area capable of additionally storing data when sufficient information may not be included in the basic header segment 61.

The data segment 64 may be included in the data out PIU or the data in PIU, and may not be included in other PIUs. In an embodiment, the extra header segment 63 and the data segment 64 may not be included in all PIUs, but may be included only in a specific PIU.

FIG. 4 is a diagram illustrating an example structure of the basic header segment 61 of the PIU. Referring to FIG. 4, the basic header segment 61 may include a transaction type, flags, a logical unit number (LUN), a task tag, an initiator ID, a command set type, a query function/task management function (Query Function, Task Manag. Function), a response, a status, a total extra header segment length (Total EHS Length), device information, and a data segment length.

The transaction type may have a unique value according to the type of the PIU. An example of the transaction type according to the type of the PIU is shown in Table 2.

TABLE 2

| When initiator device provides to target device | Transaction type | When target device provides to initiator device | Transaction type |
| --- | --- | --- | --- |
| Command PIU | 00 0001b | Response PIU | 10 0001b |
| Data out PIU | 00 0010b | Data in PIU | 10 0010b |
| X | X | Ready to transfer PIU | 11 0001b |

The flags may be fields having different values according to the transaction type. The logical unit number (LUN) may be a field indicating a number of a logical unit on which an operation is to be performed among a plurality of logical units included in an object on which the operation is to be performed. For example, each of the host 400 and the storage device 50 described with reference to FIG. 1 may include a plurality of logical units, and the logical unit number of the basic header segment 61 included in the PIU may indicate a specific logical unit among the plurality of logical units.

The task tag may be fields having different values according to the transaction type.

The initiator ID may be a field identifying an initiator requesting an operation. Therefore, the initiator ID may have different values depending on whether the host generates the PIU or the storage device generates the PIU.

The command set type may be a field included in the command PIU and the response PIU. The command set type may be a field indicating which interface supports a command, such as whether the command is an SCSI command, a UFS command, or a command defined by a manufacturer.

The query function/task management function (Query Function, Task Manag. Function) may be a field input to the PIU such as a query request, a query response, or a task management request.

The response may be a field indicating whether performance of the requested operation is successful or has failed.

The status may be a field indicating an SCSI status.

The total extra header segment length (Total EHS Length) may be a field indicating the size of the extra header segment in a 32 bit unit. The total extra header segment length (Total EHS Length) may be used when the PIU includes the extra header segment. The length of the extra header segment may be, for example, a 4 byte unit. The maximum size of the extra header segment may be, for example, 1024 bytes. When the extra header segment is not used, the total extra header segment length (Total EHS Length) may be 0.

The device information may include information used only when performing a specific function.

The data segment length may be a field indicating a length of a data segment of the PIU. When the PIU does not include the data segment, the data segment length may be 0.

FIG. 5 is a diagram illustrating an example configuration of the command PIU, and FIG. 6 is a diagram illustrating an example configuration of the response PIU.

Referring to FIGS. 1, 5, and 6, the command PIU and the response PIU may include a basic header segment, a transaction specific field, an extra header segment, and a data segment. The basic header segment included in the command PIU and the response PIU may include a total extra header length (Total EHS Length) field. When the total extra header length (Total EHS Length) field has a non-zero value, the extra header segment field included in the command PIU and the response PIU may be used. The extra header segment may start from a byte address 32 of the PIU. The extra header segment may be an area capable of additionally storing data when sufficient information may not be included in the basic header segment.

According to an embodiment, the storage device may operate according to an advanced RPMB mode. In the advanced RPMB mode, the host 400 and the storage device 50 may transmit the RPMB message using the extra header segment included in the command PIU and the response PIU. For example, the host 400 and the storage device 50 may set the total extra header segment length (Total ENS Length) field included in the basic header segments of the command PIU and the response PIU to a non-zero value, and may transmit the RPMB message by including the RPMB message in the extra header segment. Embodiments of operation methods of the advanced RPMB mode is described with reference to FIGS. 16 to 20 and 26 to 30.

Figure 7:
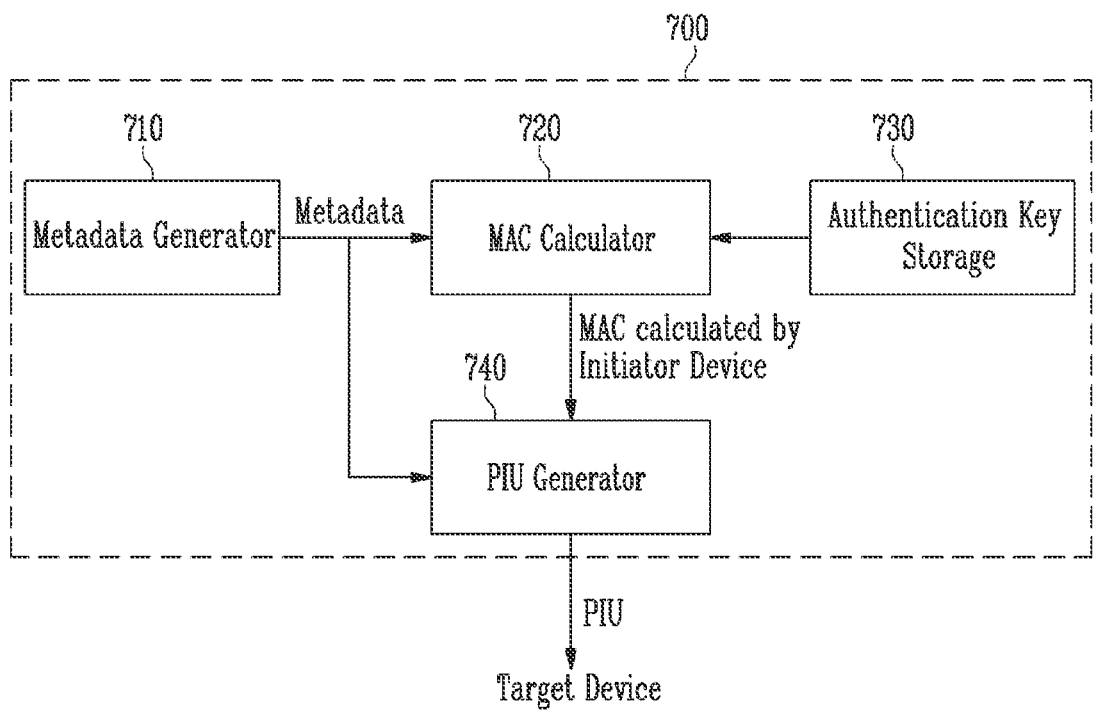
FIG. 7 is a diagram illustrating an embodiment of a PIU transmitter included in an initiator device.

FIG. 7 is a diagram illustrating an embodiment of a PIU transmitter 700 included in the initiator device, Referring to FIGS. 2 and 7, the host 400 and the storage device 50 may perform an operation related to the RPMB while transmitting and receiving the PIU. In a process of performing the authenticated data write operation and the authenticated data read operation described with reference to FIG. 2, both of the host access controller 410 and the device access controller 210 may generate the PIU and transmit the generated PIU or receive the PIU transmitted by a counterpart, to perform the authentication. Therefore, both of the host access controller 410 and the device access controller 210 may include the PIU transmitter 700 and a PIU receiver 800, for example, as described with reference to FIG. 8.

A device generating the PIU may be the initiator device. A device receiving the generated PIU may be the target device. When the host access controller 410 provides the PIU to the device access controller 210, the host 400 may be the initiator device and the storage device 50 may be the target device. Conversely, when the device access controller 210 provides the PIU to the host access controller 410, the storage device 50 may be the initiator device, and the host 400 may be the target device.

The PIU transmitter 700 may include a MAC calculator 720, an authentication key storage 730, a metadata generator 710, and a PIU generator 740. The authentication key storage 730 may store the authentication key. The authentication key storage 730 may correspond to the authentication key 111 included in the RPMB described with reference to FIG. 2. The authentication key may be stored in the RPMB according to an authentication key programming operation. Since the authentication key is used to generate the MAC when performing the authenticated data write operation and the authenticated data read operation, the authentication key may be stored in the RPMB before performing the authenticated data write operation and authenticated data read operation. The metadata generator 710 may generate the metadata. The metadata may be included in the RPMB message. The metadata may include different components according to a type of the RPMB message. The components that may be included in the metadata may be at least one of a write count value (Write Counter), a request message type, a response message type, a result, an address, a nonce, data, advanced RPMB data, a block count, and/or an advanced RPMB block count, as described, for example, with reference to FIG. 9.

The metadata generator 710 may provide the generated metadata to the MAC calculator 720 and the PIU generator 740. The MAC calculator 720 may generate the MAC using the metadata and the authentication key stored in the authentication key storage 730. For example, the MAC calculator 720 may generate the MAC using a hash-based MAC (HMAC SHA-256), The generated MAC may be used by the target device to perform the authentication. The MAC may have a length of a predetermined number of bits (e.g., 256 bits or 32 bytes). The authentication key used to generate the MAC may be a predetermined number of bits, e.g., 256 bits. However, sizes of the MAC and the authentication key are not limited according to an embodiment of the present disclosure. The MAC calculator 720 may provide the generated MAC to the PIU generator 740.

The PIU generator 740 may generate the PIU to be provided to the target device. For example, the PIU generator 740 may generate the RPMB message including the authenticated data and the metadata. The authenticated data may be the MAC generated by the MAC calculator 720. In an embodiment, the authenticated data included in the RPMB corresponding to the authentication key programming request provided in the authentication key programming operation may be the authentication key itself.

In the advanced RPMB mode, the PIU generator 740 may generate the PIU including the RPMB message in the extra header segment, and provide the generated PIU to the target device. In the advanced RPMB mode, the total extra header segment length field in the basic header segment of the PIU including the RPMB message may include a non-zero value.

For example, when performing the authenticated data read operation, the storage device 50 may be the initiator device. At this time, the MAC calculator 720 of the storage device 50 may perform a portion of an operation of the MAC using the metadata received from the metadata generator 710 and the authentication key stored in the authentication key storage 730 while reading data from the RPMB. In addition, the operation of the MAC may be completed by further using the data read from the RPMB.

When the MAC operation of the MAC calculator 720 is completed, the storage device 50 may provide the data read from the RPMB to the host 400. At the same time, the PIU generator 740 may generate the RPMB message including the MAC of which the operation is completed, and generate the PIU including the RPMB message in the extra header segment. The PIU generated at this time may be the response PIU. When data provision to the host 400 is completed, the response PIU generated by the PIU generator 740 may be provided to the host 400.

Figure 8:
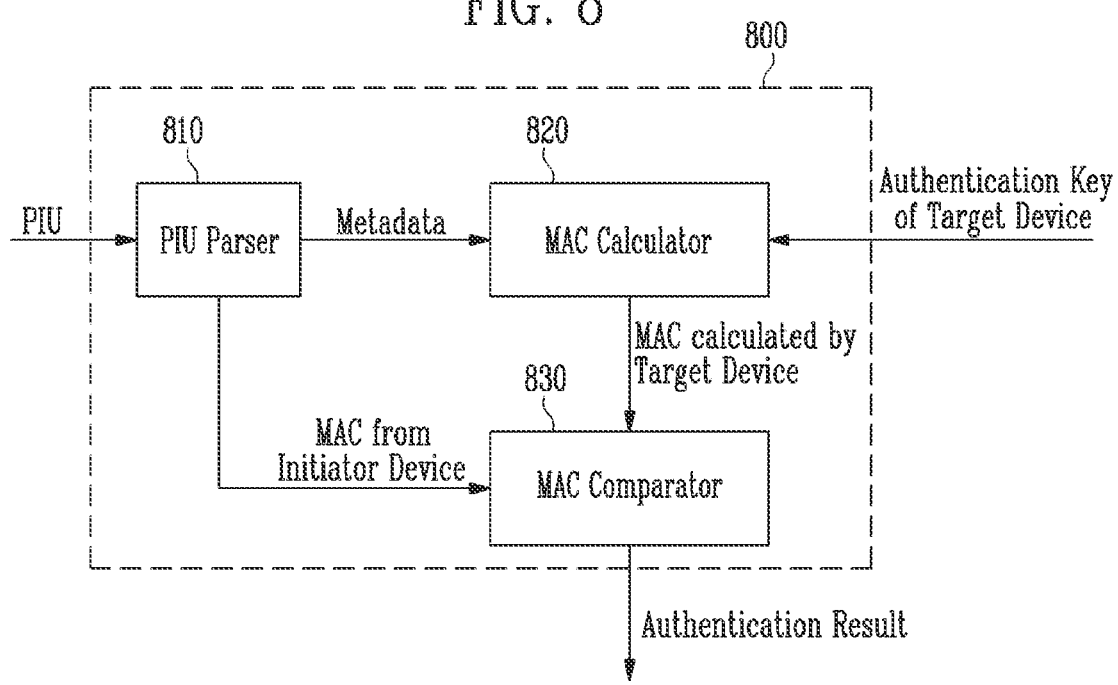
FIG. 8 is a diagram illustrating an embodiment of a PIU receiver included in a target device.

FIG. 8 is a diagram illustrating an embodiment of the PIU receiver 800 included in the target device.

Referring to FIGS. 2 and 8, the host 400 and the storage device 50 may perform the operation related to the RPMB while transmitting and receiving the PIU. In the process of performing the authenticated data write operation and the authenticated data read operation described with reference to FIG. 2, both of the host access controller 410 and the device access controller 210 may generate the PIU, and may transmit the generated PIU or receive the PIU transmitted from a counterpart, to perform the authentication. Therefore, the host access controller 410 and the device access controller 210 may include both of the PIU transmitter 700 described, for example, with reference to FIG. 7 and the PIU receiver 800.

The device generating the PIU may be the initiator device. The device receiving the generated PIU may be the target device. When the host access controller 410 provides the PIU to the device access controller 210, the host 400 may be the initiator device and the storage device 50 may be the target device, Conversely, when the device access controller 210 provides the PIU to the host access controller 410, the storage device 50 may be the initiator device, and the host 400 may be the target device.

The PIU receiver 800 may include a PIU parser 810, a MAC calculator 820, and a MAC comparator 830. The PIU parser 810 may receive the PIU provided by the initiator device. The PIU received by the PIU parser 810 may be the command PIU or the response PIU in the advanced RPMB mode.

The PIU parser 810 may obtain the RPMB message by parsing the received PIU, and may obtain the metadata and the authenticated data included by parsing the RPMB message. In an embodiment, the metadata may include different components according to, for example, the type of the RPMB message. The components that may be included in the metadata may be at least one of the write count value (Write Counter), the request message type, the response message type, the result, the address, the nonce, the data, the advanced RPMB data, the block count, and the advanced RPMB block count to be described with reference to FIG. 9.

The authenticated data may be the MAC generated by the initiator device. In an embodiment, the authenticated data included in the RPMB corresponding to the authentication key programming request provided in the authentication key programming operation may be the authentication key itself.

The MAC calculator 820 may obtain the authentication key previously stored in the target device. The authentication key previously stored in the target device may be the same value as the authentication key stored in the initiator device.

The MAC calculator 820 may calculate the MAC using the metadata received from the PIU parser 810 and the authentication key previously stored in the target device. For example, the MAC calculator 820 may calculate the MAC using a hash-based MAC (HMAC SHA-256). The MAC calculator 820 may provide the calculated MAC to the MAC comparator 830.

The MAC comparator 830 may compare whether the MAC received from the PIU parser 810 and the MAC received from the MAC calculator 820 match, and may output an authentication result according to a comparison result. The authentication result may be used to perform the authenticated data write operation and the authenticated data read operation, which are operations on the RPMB.

As a result, when the authentication keys stored in the initiator device and the target device are different, or the metadata used for calculating the MAC are different, the authentication may fail. In one embodiment, only when the authentication keys stored in the initiator device and the target device are the same and the metadata used for calculating the MAC are the same, the authentication may be successful, Therefore, the RPMB may provide a data storage function that provides high security.

For example, when performing the authenticated data write operation, the storage device 50 may be the target device. At this time, the PIU parser 810 of the storage device 50 may receive the command PIU requesting to access the RPMB from the host 400. The PIU parser 810 may obtain the RPMB message by parsing the received PIU, and may obtain the metadata and a host MAC included by parsing the RPMB message.

Following the command PIU, the MAC calculator 820 may perform a portion of the operation of the MAC using the metadata received from the PIU parser 810 and the authentication key previously stored in the RPMB while the storage device 50 receives data to be stored in the RPMB from the host. In addition, the MAC operation may be completed by further using data to be stored, which is received from the host.

When the MAC operation of the MAC calculator 820 is completed, the MAC comparator 830 may compare the host MAC received from the PIU parser 810 with a device MAC operated by the MAC calculator 820. As a result of comparison, when the authentication is passed, data may be stored in RPMB. At this time, the PIU transmitter 700 described with reference to FIG. 7 may generate the response PIU.

FIG. 9 is a diagram illustrating an example of an RPMB message. Referring to FIGS. 1 and 9, when the host 400 or the storage device 50 transmits and receives the PIU related to the RPMB, the host 400 or the storage device 50 may transfer the RPMB message to each other. The RPMB message may include information for authentication.

In one embodiment, the RPMB message may include a plurality of components. For example, the RPMB message may include some or all of the plurality of components shown in FIG. 9 according to a situation in which the RPMB message is transferred.

A request message type may have a predetermined size, e.g., 2 bytes. The request message type may indicate a type of request to the RPMB. The request message type may be included in a request transmitted by the initiator device to the target device. An example of a code value that the request message type may have is shown in Table 3,

TABLE 3

| Code | Request Message Types |
| --- | --- |
| 0001h | Authentication Key programming request |
| 0002h | Write Counter read request |
| 0003h | Authenticated data write request |
| 0004h | Authenticated data read request |
| 0005h | Result read request |
| 0006h | Secure Write Protect Configuration Block write request |

TABLE 3-continued

| Code | Request Message Types |
| --- | --- |
| 0007h | Secure Write Protect Configuration Block read request |
| Others | Reserved |

The authentication key programming request may be a request message type requesting to program the authentication key. The write counter read request may be a request message type requesting the write count value stored in the write counter. The authenticated data write request may be a request message type requesting to store data in the RPMB. The authenticated data read request may be a request message type requesting to read the data stored in the RPMB. The result read request may be a request message type requesting a performance result (a value stored in the result register) of an operation related to the RPMB, The RPMB message having these request message types may be examples of a message requesting the access to the secure storage area 110*a*. A response message type may have a size of 2 bytes. The response message type may be a component indicating a type of response. The response message type may not be included in the request transmitted by the initiator device to the target device, and may be included in a response transmitted by the target device to the initiator device. An example code value that the response message type may have is shown in Table 4.

TABLE 4

| Code | Response Message Types |
| --- | --- |
| 0100h | Authentication Key programming response |
| 0200h | Write Counter read response |
| 0300h | Authenticated data write response |
| 0400h | Authenticated data read response |
| 0500h | Revered |
| 0600h | Secure Write Protect Configuration Block write response |
| 0700h | Secure Write Protect Configuration Block read response |
| Others | Reserved |

The authentication key programming response may be a response message type indicating a response to the RPMB message requesting to program the authentication key. The write counter read response may be a response message type indicating the RPMB message that transmits the write count value stored in the write counter to the initiator device. The authenticated data write response may be a response message type indicating a response to the authenticated data write request requesting to store data in the RPMB. The authenticated data read response may be a response message type indicating a response to the authenticated data read request requesting to read the data stored in the RPMB. A result read response may be a response message type indicating a response to the result read request requesting the performance result (e.g., the value stored in the result register) of the operation related to the RPMB. The authentication key may have a predetermined size, e.g., 32 bytes. The authentication key may be an RPMB message component included in the PIU corresponding to the authentication key programming request when initially requesting programming to the RPMB, Therefore, the authentication key may be included only in the request transmitted by the initiator device to the target device.

The MAC may have a predetermined size (e.g., 32 bytes) and may be included in the response transmitted by the target device to the initiator device, as well as the request transmitted by the initiator device to the target device. The MAC may be an RPMB message component used for authentication.

The result may have a predetermined size (e.g., 2 bytes) and may be a value stored in the result register included in the RPM B. Therefore, the result may be included in the response transmitted by the target device to the initiator device.

The write counter may have a predetermined size (e.g., 4 bytes) and may indicate the total number of successfully performed authenticated data write operations. The write counter may be the write count value stored in the write counter included in the RPMB. The write counter may be included in the response transmitted by the target device to the initiator device, as well as the request transmitted by the initiator device to the target device.

The address may have a predetermined size (e.g., 2 bytes) and may be data to be stored in the RPMB or a logical address of the data stored in the RPMB, The address may be included in the response transmitted by the target device to the initiator device, as well as the request transmitted by the initiator device to the target device.

The nonce may have a predetermined size (e.g., 16 bytes) and may be a value having randomness. The nonce may be included in the response transmitted by the target device to the initiator device, as well as the request transmitted by the initiator device to the target device. In an embodiment, the nonce may be generated by the host 400, and the storage device 50 may copy and use the nonce generated by the host 400.

The data may be the data to be stored in the RPMB or the data read from the RPMB. The data may have a predetermined size (e.g., 256 bytes). In an embodiment, the data may be data transferred between the initiator device and the target device when the RPMB is accessed in the normal RPMB mode.

The advanced RPMB data may be the data to be stored in the RPMB or the data read from the RPMB in the advanced RPMB mode. The advanced RPMB data may be transmitted in a predetermined size, e.g., a 4 KB unit. The advanced RPMB data may be the data to be stored in the RPMB according to the authenticated data write request, or the data read from the RPMB by the storage device 50 according to the authenticated data read request.

The block count may have a predetermined size (e.g., 2 bytes) and may be a value indicating the number of blocks of data transferred between the initiator device and the target device in the normal RPMB mode. In the normal RPMB mode, one block may have a size of, for example, 256 bytes.

The advanced RPMB block count may be a value indicating the number of blocks of the advanced RPMB data transferred between the initiator device and the target device in the advanced RPMB mode. In the advanced RPMB mode, one block may have a predetermined size, e.g., 4 KB.

The RPMB message components described with reference to FIG. 9 may be included in the RPMB message transferred between the host 400 and the storage device 50 or between the initiator device and the target device when the RPMB block is accessed in the normal RPMB mode or the advanced RPMB mode. The RPMB message components may be included in one PIU or may be divided and included in a plurality of PIUs according to a type of an operation.

Figure 10:
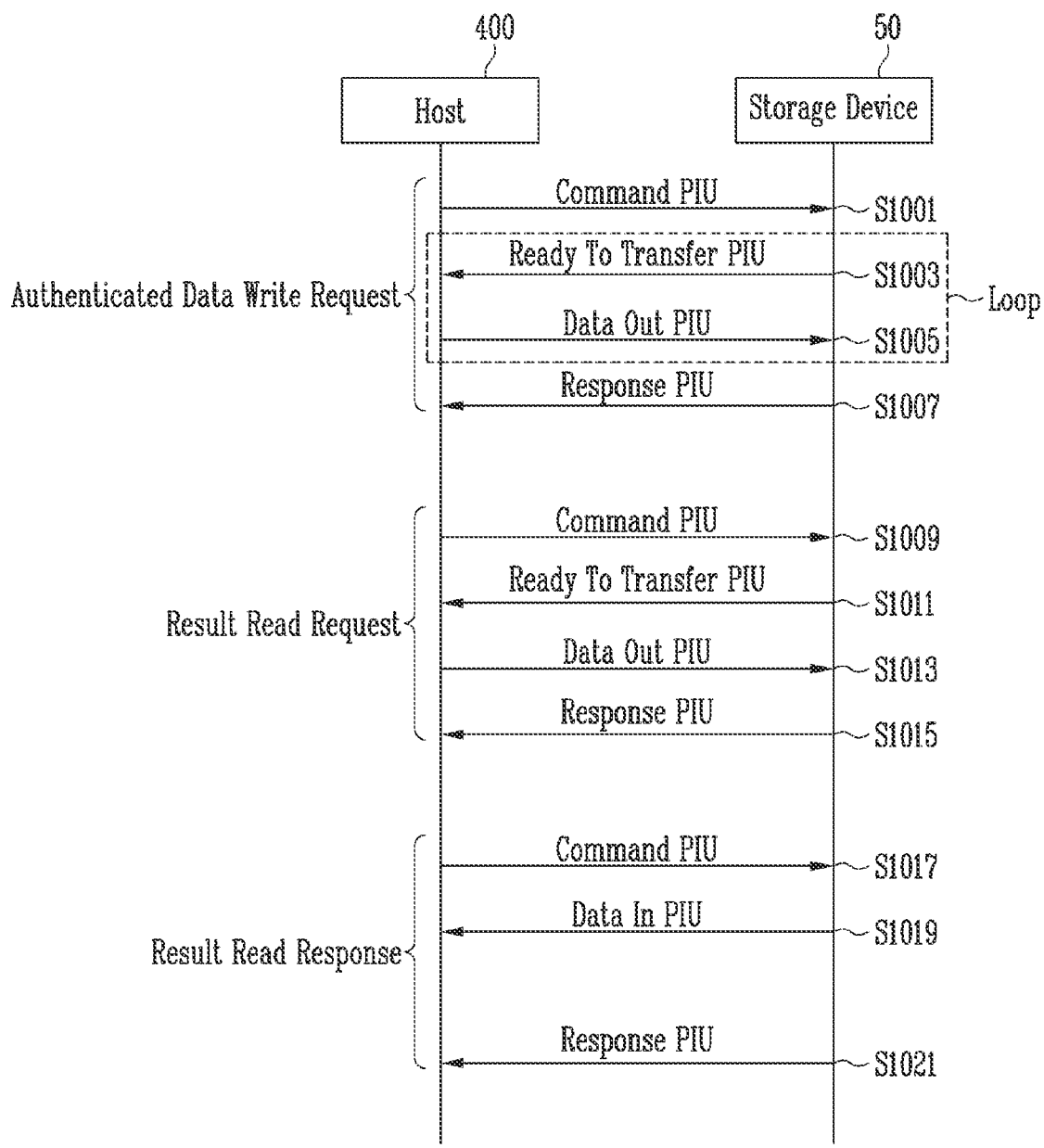
FIG. 10 is a flowchart illustrating an embodiment of an authenticated data write operation performed in a normal RPMB mode.

FIG. 10 is a flowchart illustrating an embodiment of an authenticated data write operation performed in the normal RPMB mode.

Referring to FIGS. 1, 2, and 10, in the normal RPMB mode, the host 400 may transfer the command PIU three times to perform the authenticated data write operation, and the storage device 50 may transfer the response PIU three times.

For example, the authenticated data write operation may include a process of transferring the RPMB messages of the authenticated data write request, the result read request, and the result read response through the PIU.

The authenticated data write request may be performed through operations S1001 to S1007, the result read request may be performed through operations S1009 to S1015, and the result read response may be performed through operations S1017 to S1021.

The authenticated data write request includes a process in which the host 400 transfers the RPMB message requesting to store the data in the RPMB and the data to be stored to the storage device 50.

The result read request may be a request for transferring the RPMB message requesting the value stored in the result register included in the RPMB in which the performance result of the authenticated data write operation is stored, from the host 400 to the storage device 50.

The result read response may be a response in which the storage device 50 transfers the RPMB message providing the value of the result register to the host 400.

In operation S1001, the host 400 may provide the command PIU to the storage device 50. The command PIU transferred in operation S1001 may be a security protocol out command indicating that the host 400 will transmit data. In operation S1003, the storage device 50 may provide the ready to transfer PIU to the host 400 in response to the command PIU received in operation S1001. The ready to transfer PIU may be a PIU provided when the storage device 50 is ready to receive the data to be provided by the host 400, In an embodiment, the ready to transfer PIU may be a PIU providing a message indicating that the storage device 50 is ready to receive the data out PIU.

In operation S1005, the host 400 may provide the data out PIU to the storage device 50. The data out PIU provided by the host 400 may include the RPMB message corresponding to the authenticated data write request. The RPMB message transferred in operation S1005 may include a stuff byte, the authenticated data, and the metadata. The metadata may include data to be stored in the RPMB. Since FIG. 10 shows a case where the authenticated data write operation is performed in the normal RPMB mode, data may include a plurality of blocks having a predetermined size, e.g., 256 bytes. The RPMB message transferred in operation S1005 may be described with reference to the example embodiment of FIG. 11.

In operation S1007, the storage device 50 may provide the response PIU to the host 400, The response PIU transmitted in operation S1007 may be a response to the command PIU transmitted in operation S1001.

In operation S1009, the host 400 may provide the command PIU to the storage device 50. The command PIU transferred in operation S1009 may be the security protocol out command indicating that the host 400 will transmit data. Thereafter, in operation S1011, the storage device 50 may provide the ready to transfer PIU to the host 400 in response to the command PIU received in operation S1009. The ready to transfer PIU may be a PIU provided when the storage device 50 is ready to receive the data to be provided by the host 400. In an embodiment, the ready to transfer PIU may be a PIU providing a message indicating that the storage device 50 is ready to receive the data out PIU.

In operation S1013 the host 400 may provide the data out PIU to the storage device 50, The data out PIU provided in operation S1013 may include the RPMB message corresponding to the result read request. In an embodiment, the RPMB message included in the data out PIU provided in operation S1013 is described with reference to the example embodiment of FIG. 12.

In operation S1015, the storage device 50 may provide the response PIU to the host 400. The response PIU transmitted in operation S1015 may be a response to the command PIU transmitted in operation S1009.

In operation S1017, the host 400 may provide the command PIU to the storage device 50, The command PIU provided in operation S1017 may be a security protocol in command indicating a command requesting data and information from the storage device 50.

In operation S1019, the storage device 50 may provide the data in PIU to the host 400. The data in PIU transferred in step S1019 may include the RPMB message corresponding to the result read response. The RPMB message transferred in operation S1019 may include the stuff byte, the authenticated data, and the metadata. The metadata may include an updated write count value and the value of the result register indicating the performance result of the authenticated data write operation. The RPMB message transferred in operation S1019 is described with reference to the example embodiment of FIG. 13.

In operation S1021, the storage device 50 may provide the response PIU to the host 400. The response PIU transmitted in operation S1021 may be a response to the command PIU transmitted in operation S1017.

FIG. 11 is a diagram Illustrating an example of the RPMB message provided through operation S1005 of FIG. 10.

Referring to FIGS. 1, 2, 10, and 11, the RPMB message corresponding to the authenticated data write request may include the stuff byte, the authenticated data, and the metadata.

The stuff byte may be a bit added to synchronize a predetermined data format or data communication. In an embodiment, a field corresponding to the stuff byte may be "0".

The authenticated data included in the RPMB message corresponding to the authenticated data write request may be the MAC generated by the host access controller 410 described, for example, with reference to FIG. 2.

The metadata may include the data to be stored in the RPMB, the nonce, the current write count value, the address corresponding to the data, the number of blocks of data (e.g., one block is 256B), and the request message type indicating that the RPMB message is the authenticated data write request. In an embodiment, a field corresponding to the nonce may be "0".

FIG. 12 is a diagram illustrating an example of the RPMB message provided through operation S1013 of FIG. 10.

Referring to FIGS. 1, 2, 10, and 12, the RPMB message corresponding to the result read request may include the stuff byte, the authenticated data, and the metadata.

In an embodiment, in the RPMB message corresponding to the result read request, only the request message type included in the metadata may have a non-zero value, and values of the remaining fields may be "0". The request message type may include a code value 0005h indicating that the RPMB message is the result read request.

FIG. 13 is a diagram illustrating an example of the RPMB message provided through operation S1019 of FIG. 10.

Referring to FIGS. 1, 2, 10, and 13, the RPMB message corresponding to the result read response may include the stuff byte, the authenticated data, and the metadata.

The stuff byte may be a bit added to synchronize a predetermined data format or data communication. In an embodiment, the field corresponding to the stuff byte may be "0".

The authenticated data included in the RPMB message corresponding to the result read response may be the MAC generated by the device access controller 210 described, for example, with reference to FIG. 2.

In one embodiment, the access perform unit 212 may generate the metadata to be included in the RPMB message, and may generate the MAC using the generated metadata and the authentication key 111 stored in the RPMB.

The metadata may include the updated write count value, the address of data stored by the authenticated data write operation, the result code indicating the performance result of the authenticated data write operation, and a predetermined code (e.g., "0300h") which is a response message type code indicating that the RPMB message is the authenticated data write response. Here, the address may be the same value as the address included in the RPMB message corresponding to the authenticated data write request described, for example, with reference to FIG. 11.

In an embodiment, the stuff byte, the data, the nonce, and the block count fields included in the RPMB message corresponding to the result read response nay be "0".

Figure 14:
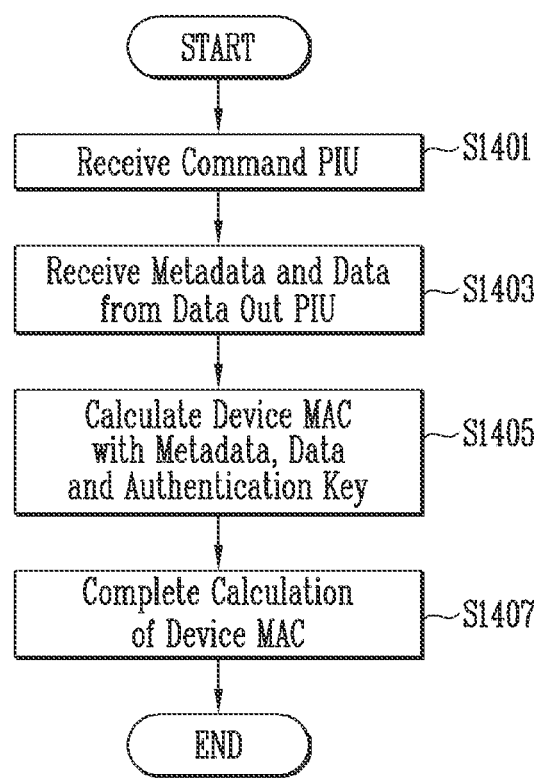
FIG. 14 is a flowchart illustrating an embodiment of a message authentication code (MAC) operation process performed during an authenticated data write operation performed in a normal RPMB mode.

FIG. 14 is a flowchart illustrating an embodiment of a MAC operation process performed during the authenticated data write operation performed in the normal RPMB mode.

Referring to FIGS. 1, 2, and 10 to 14, in operation S1401, the storage device 50 may receive the command PIU from the host 400. This may correspond to operation S1001 of FIG. 10, Thereafter, in operation S1403, the storage device 50 may receive the data out PIU from the host 400. This may correspond to operation S1005 of FIG. 10, and the data out PIU received at this time may include the RPMB message as shown, for example, in FIG. 11. Therefore, the storage device 50 may receive the data to be stored in the RPMB and other metadata from the data out PIU.

In operation S1405, the storage device may operate the MAC using the metadata and the data received from the data out PIU, and the authentication key stored in the RPMB. Such an operation may be started after operation S1005 of FIG. 10, Thereafter, the MAC of which the operation is completed in operation S1407 may be included in the RPMB message of the response PIU of operation S1021 of FIG. 10 and provided to the host 400. The RPMB message at this time may be confirmed through FIG. 13.

Figure 15:
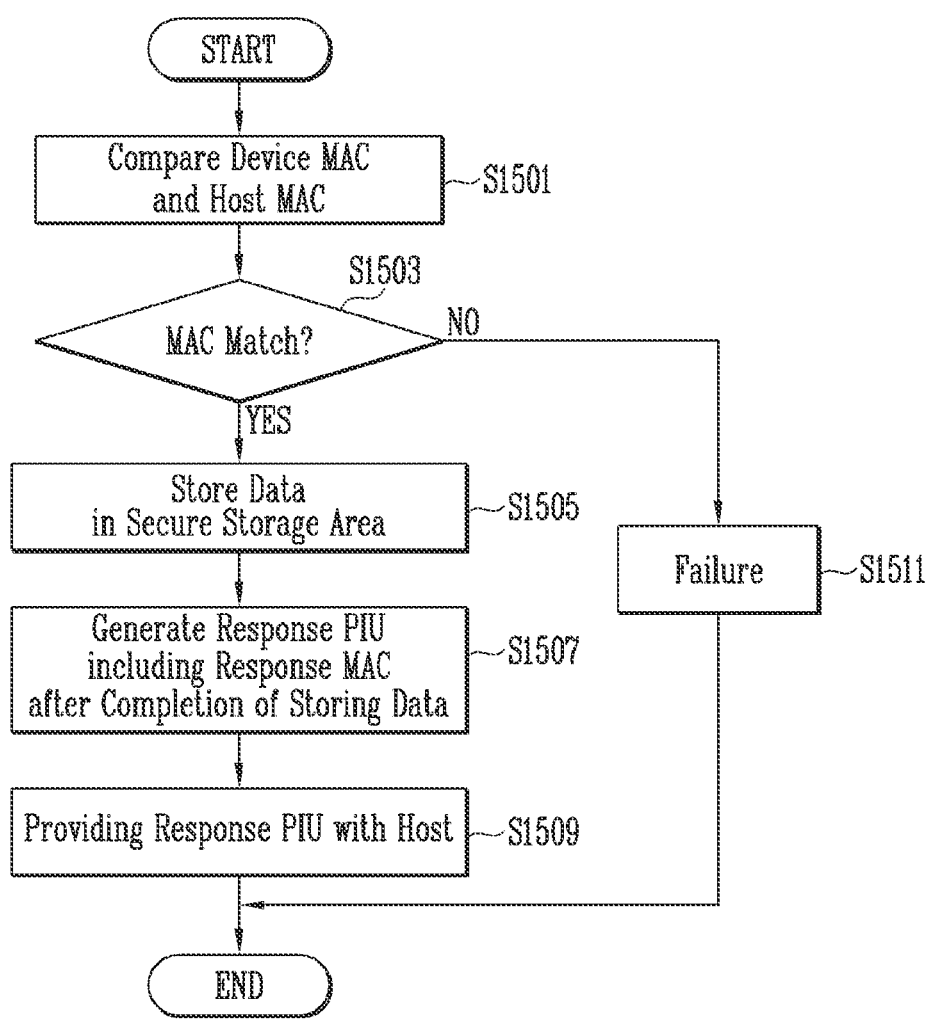
FIG. 15 is a flowchart illustrating an embodiment of an authenticated data write operation using the MAC operated in FIG. 14.

FIG. 15 is a flowchart illustrating an embodiment of the authenticated data write operation using the MAC operated in FIG. 14.

Referring to FIGS. 1, 2, and 10 to 15, in operation S1501, the storage device 50 may compare the host MAC received from the host 400 with the device MAC operated in FIG. 14, The host MAC may be obtained from the RPMB message included in the data out PIU of operation S1005 of FIG. 10, and such an RPMB message may be confirmed through FIG. 11.

When the device MAC and the host MAC match in operation S1503, the data may be stored in the secure storage area 110a, for example, the RPMB in operation S1505. When data storage is completed, the storage device 50 may generate the response PIU including a response MAC in operation S1507, and may provide the response PIU to the host 400 in operation S1509, This may correspond to operation S1021 of FIG. 10, and the RPMB message included in the response PIU may be confirmed through FIG. 13.

When the device MAC and the host MAC do not match in operation S1503, the storage device may fail the write request to the secure storage area 110a, for example, the RPMB in operation S1511, Accordingly, data may not be stored and an error message may be provided to the host 400. Such an error message may be included in the RPMB message of FIG. 13 in a result code form and provided to the host 400.

Figure 16:
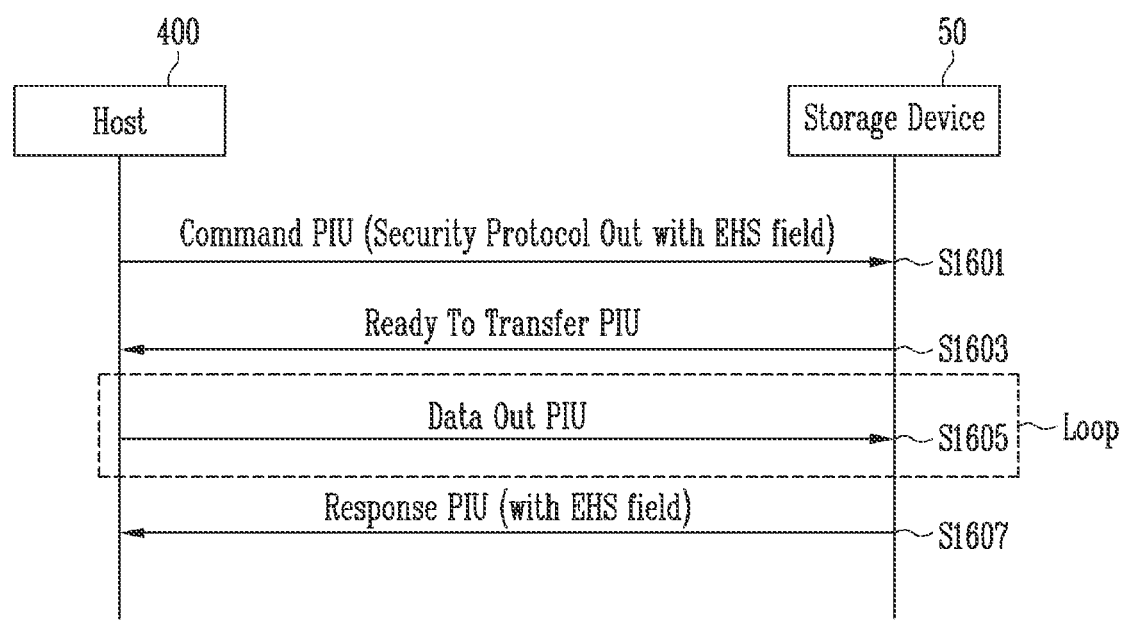
FIG. 16 is a flowchart illustrating an authenticated data write operation performed in an advanced RPMB mode of a storage device according to an embodiment of the present disclosure.

FIG. 16 is a flowchart illustrating an authenticated data write operation performed in an advanced RPMB mode of a storage device according to an embodiment of the present disclosure.

Referring to FIGS. 1, 2, and 16, in the advanced RPMB mode, the host 400 may transfer the command PIU once to perform the authenticated data write operation, and the storage device 50 may transfer the response PIU once.

For example, in operation S1601, the host 400 may provide the command PIU to the storage device 50, The command PIU may include the RPMB message in the extra header segment. The command PIU may be the security protocol out command indicating that the host 400 will transmit data. An example of the RPMB message transferred in operation S1601 is described with reference to FIG. 17.

In operation S1603, the storage device 50 may provide the ready to transfer PIU to the host 400 in response to the command PIU received in operation S1601.

In operation S1605, the host 400 may provide the data out PIU to the storage device 50. Since the host 400 has already provided the RPMB message to the storage device 50 by including the RPMB message in the extra header segment of the command PIU in operation S1601, the data out PIU transferred in operation S1605 may does not include the RPMB message and may include only the data to be stored in the RPMB.

In operation S1607, the storage device 50 may provide the response PIU to the host 400. The response PIU provided by the storage device 50 may include the RPMB message. The RPMB message may be included in the extra head segment of the response PIU.

FIG. 17 is a diagram illustrating an example of the structure of the command PIU transferred in operation S1601 of FIG. 16.

Referring to FIGS. 1, 2, 16, and 17, the command PIU transferred in operation S1601 may be the PIU using the extra header segment, differently from the command PIU transferred in the embodiment described with reference to FIGS. 10 to 15, Therefore, a field indicating total extra header segment length information included in the basic header segment may be set to a non-zero value (02h).

The extra header segment of the command PIU transferred in operation S1601 may include the RPMB message. The RPMB message included in the extra header segment may include some data of the RPMB message corresponding to the authenticated data write request described with reference to FIG. 11.

For example, the extra header segment of the command PIU may include the authenticated data and the metadata. Differently from the RPMB message of FIG. 11, the metadata included in the extra header segment may not include the data to be stored in the RPMB. The metadata may include the nonce generated by the host, the current write count value, the address corresponding to the data, the number of blocks of data (e.g., one block is 4 KB), and the request message type indicating that the RPMB message is the authenticated data write request (0003h), The authenticated data may be, for example, the MAC generated by the device access controller 210 described with reference to FIG. 2.

FIG. 18 is a diagram illustrating an example of the structure of the response PIU transferred in operation S1607 of FIG. 16.

Referring to FIGS. 1, 2, 16, and 18, the response PIU transferred in operation S1607 may be the PIU using the extra header segment, differently from the response PIU transferred in the embodiment described with reference to FIGS. 10 to 15. Therefore, the field indicating the total extra header segment length information included in the basic header segment may be set to a non-zero value (02h).

The extra header segment of the response PIU transferred in operation S1607 may include the RPMB message. The RPMB message included in the extra header segment may include some data of the RPMB message corresponding to the result read response described with reference to FIG. 13.

For example, the extra header segment of the response PIU may include the authenticated data and the metadata. The metadata may include the write count value of the write counter updated according to the performance of the authenticated data write operation, the address of the data stored by the authenticated data write operation, the result code indicating the performance result of the authenticated data write operation, and the response message type indicating that the RPMB message is the authenticated data write response. Here, the address may be the same value as the address included in the RPMB message corresponding to the authenticated data write request described with reference to FIG. 17. The nonce may be a value obtained by copying the nonce included in the RPMB message corresponding to the authenticated data write request described with reference to FIG. 17. The authenticated data may be the MAC generated by the device access controller 210 described with reference to FIG. 2 using the metadata and the authentication key stored in the RPMB, FIG. 19 is a flowchart illustrating a MAC operation process performed during an authenticated data write operation performed in an advanced RPMB mode of a storage device according to an embodiment of the present disclosure.

Referring to FIGS. 1, 2, and 16 to 19, in operation S1901, the storage device 50 may receive the command PIU from the host 400 and obtain the metadata from the command PIU. This may correspond to operation S1601 of FIG. 16. Thereafter, in operation S1903, the storage device 50 may receive the data out PIU from the host 400 and simultaneously operate the device MAC using the metadata received from the command PIU and the authentication key stored in the RPMB. Such an operation may be partially performed during operation S1605 of FIG. 16. For example, the operation may be performed before operation S1605 and may be continuously performed during operation S1605, or the operation may be started while operation S1605 is performed. In addition, the data out PIU transferred by operation S1605 may be provided a plurality of times. For example, when the size of data included in the data out PIU is large (e.g., greater than a predetermined value), the data may be transmitted in a plurality of data PIUs. In this case, a portion of the device MAC operation may be further performed using the data included in the data out PIU received before the data out PIU which is being received. The operation of the device MAC may be completed by using all of data of which reception from the data out PIU is completed in operation S1905.

Figure 19:
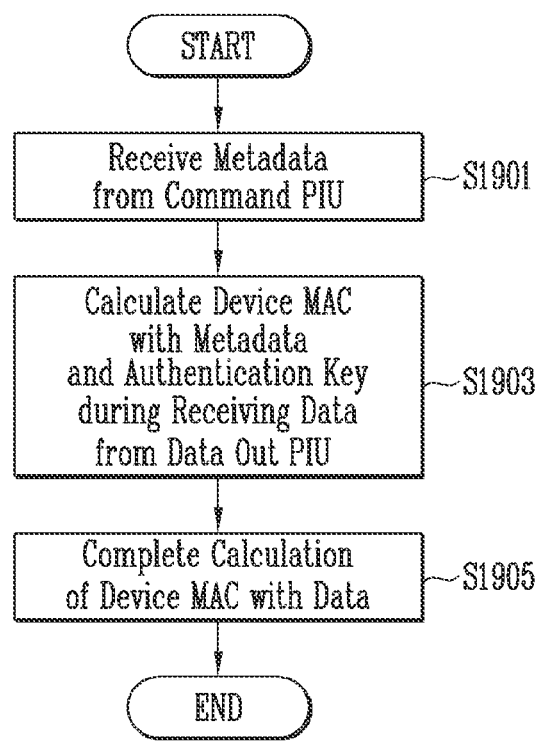
FIG. 19 is a flowchart illustrating an MAC operation process performed during an authenticated data write operation performed in an advanced RPMB mode of a storage device according to an embodiment of the present disclosure.

For example, in a case of FIG. 19 showing the MAC operation process according to an embodiment of the present disclosure, differently from FIGS. 10 to 15, since the RPMB message is received from the host through the command PIU rather than the data out PIU, meta data may be obtained comparatively faster. In addition, an MAC operation completion time point may be earlier by starting the MAC operation before or during receiving the data to be stored in the RPMB, rather than starting the MAC operation after receiving the data to be stored in the RPMB.

Figure 20:
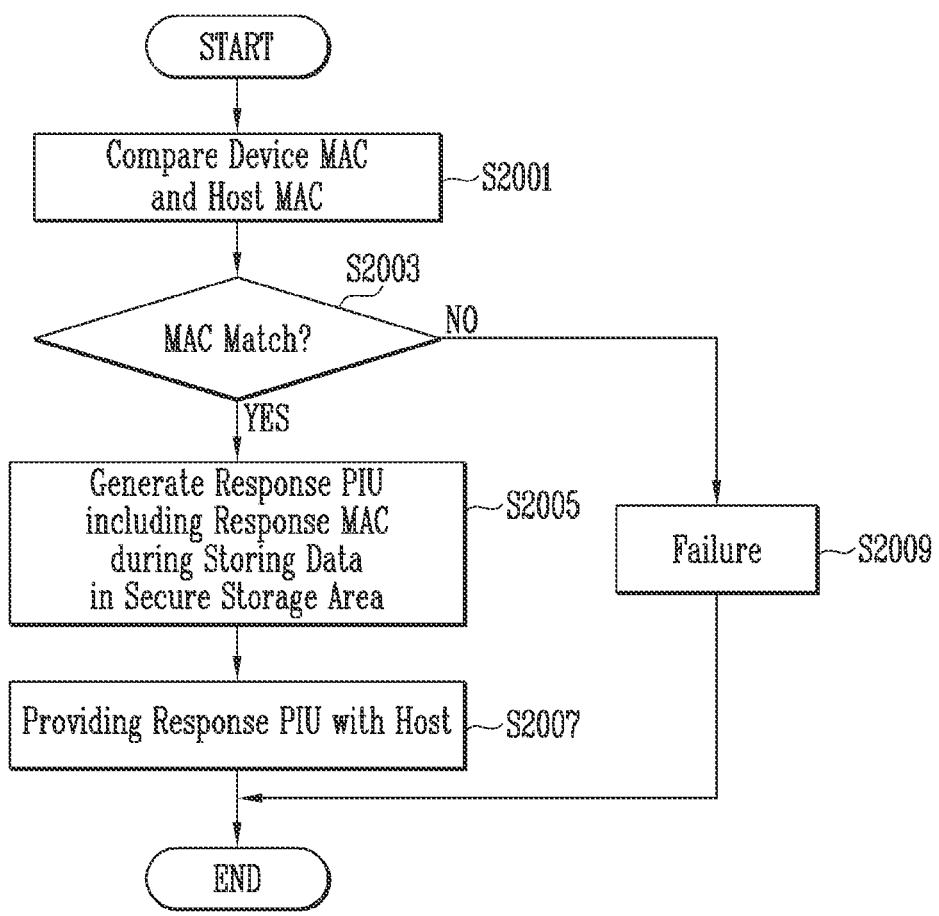
FIG. 20 is a flowchart illustrating an embodiment of an authenticated data write operation using the MAC operated in FIG. 19.

FIG. 20 is a flowchart illustrating an embodiment of the authenticated data write operation using the MAC operated in FIG. 19.

Referring to FIGS. 1, 2, and 16 to 20, in operation S2001, the storage device 50 may compare the host MAC received from the host 400 with the device MAC operated in FIG. 19, The host MAC may be obtained from the command PIU in operation S1601 of FIG. 16, and such a command PIU may be confirmed through FIG. 17.

When the device MAC and the host MAC match in operation S2003, the data may be stored in the secure storage area 110a, for example, RPMB in operation S2005, and at the same time the storage device 50 may generate the response PIU including the response MAC. Thereafter, the response PIU may be provided to the host 400 in operation S2007. This may correspond to operation S1607 of FIG. 16, and the response PIU may be confirmed through FIG. 18.

When the device MAC and the host MAC do not match in operation S2003, the storage device may fail the write request to the secure storage area 110a, for example, the RPMB in operation S2009. Accordingly, data may not be stored and an error message may be provided to the host 400. Such an error message may be included in the RPMB message included in the response PIU of FIG. 18 in a result code form and provided to the host 400.

For example, in the case of FIG. 20 showing a process of the authenticated data write operation according to an embodiment of the present disclosure, differently from FIGS. 10 to 15, since generation of the response MAC and generation of the response PIU is performed together with data storage in the secure storage area 110a, the completion time point of the authenticated data write operation may be earlier.

Figure 21:
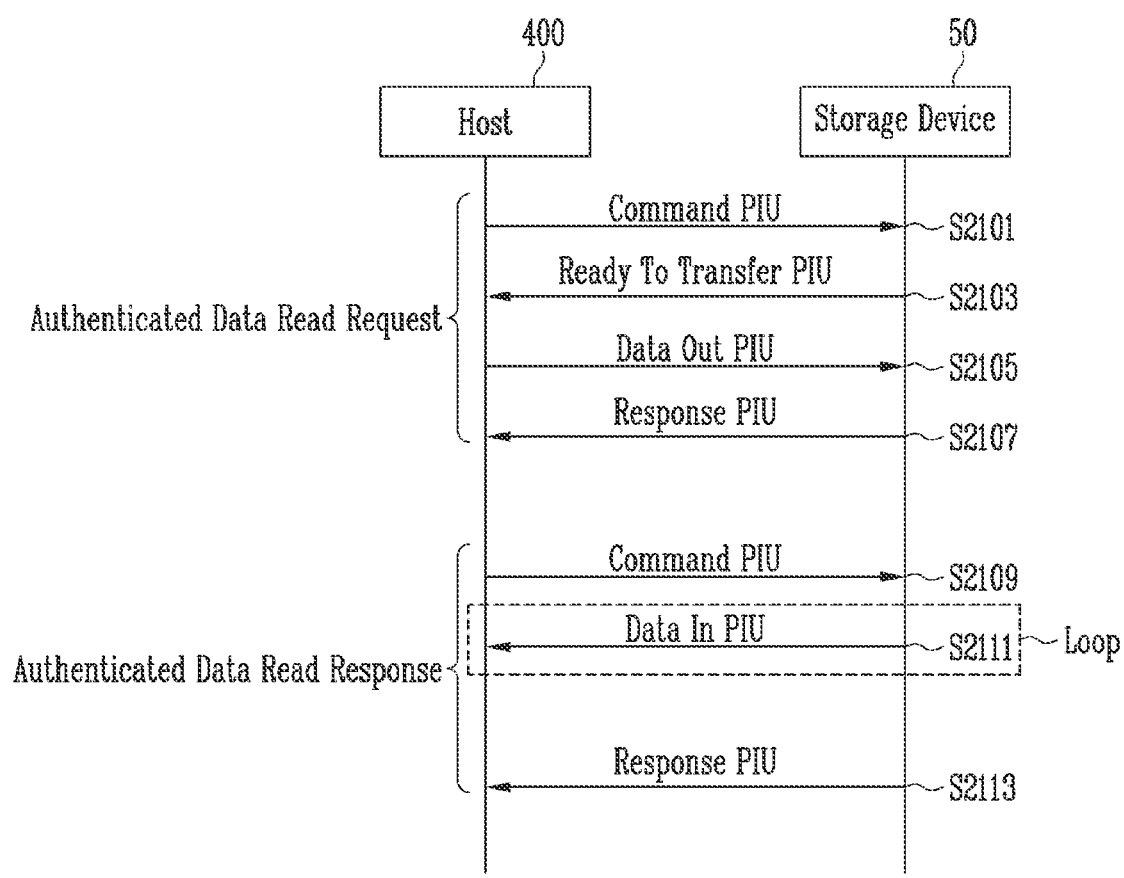
FIG. 21 is a flowchart illustrating an embodiment of an authenticated data read operation performed in the normal RPMB mode.

FIG. 21 is a flowchart illustrating an embodiment of the authenticated data read operation performed in the normal RPMB mode.

Referring to FIGS. 1, 2, and 21, in the normal RPMB mode, the host 400 may transfer the command PIU twice to perform the authenticated data read operation, and the storage device 50 may transfer the responds PIU twice. For example, the authenticated data read operation may include a process of transferring the RPMB messages corresponding to each of the authenticated data read request and the authenticated data read response through the PIU.

The authenticated data read request may be performed through operations S2101 to S2107, and the authenticated data read response may be performed through operations S2109 to S2113.

The authenticated data read request may include a process in which the host 400 transfers the RPMB message indicating the read request for the data stored in the RPMB to the storage device 50. The authenticated data read response may include a process in which the storage device 50 transfers the data read from the RPMB to the host 400.

In operation S2101, the host 400 may provide the command PIU to the storage device 50. The command PIU provided in operation S2101 may be the security protocol out command indicating that the host 400 will transmit data.

In operation S2103, the storage device 50 may provide the ready to transfer PIU to the host 400.

In operation S2105, the host 400 may provide the data out PIU to the storage device 50. The data out PIU provided in operation S2105 may include the RPMB message. For example, the RPMB message provided in operation S2105 may include the metadata. Here, the metadata includes the nonce generated by the host, the address to be read, the block count indicating the number of blocks of data to be read, and the request message type indicating that the RPMB message is the authenticated data read request. An example of the RPMB message corresponding to the authenticated data read request is described with reference to FIG. 22.

In operation S2107, the storage device 50 may provide the response PIU to the host 400. The response PIU provided by the storage device 50 may be a response to the command PIU transferred in operation S2101.

In operation S2109, the host 400 may provide the command PIU to the storage device 50. The command PIU provided in operation S2109 may be the security protocol in command indicating the command requesting data and information from the storage device 50.

In operation S2111, the storage device 50 may provide the data in PIU to the host 400. The data in PIU provided by the storage device 50 may include the RPMB message. For example, the RPMB message provided in operation S2111 may include the stuff byte, the authenticated data, and the metadata. Here, the authenticated data may be the MAC generated by the storage device 50. The metadata may include the data read from the RPMB, the nonce, the address, the block count indicating the number of blocks of the read data, and the response message type indicating that the RPMB message is the authenticated data read response. An example of the RPMB message corresponding to the authenticated data read response is described with reference to FIG. 23.

In operation S2113, the storage device 50 may provide the response PIU to the host 400. The response PIU received by the host 400 in operation S2113 may be a response to the command PIU transferred in operation S2109.

FIG. 22 is a diagram illustrating an example of the RPMB message provided through operation S2105 of FIG. 21.

Referring to FIGS. 1, 4, 21, and 22, the RPMB message corresponding to the authenticated data read request may include the metadata and the stuff byte without the authenticated data. The stuff byte may be a bit added to synchronize a predetermined data format or data communication. In an embodiment, the field corresponding to the stuff byte may be "0".

The metadata may include the nonce generated by the host, the address to be read, the block count indicating the number of blocks of the data to be read, and the request message type indicating that the RPMB message is the authenticated data read request.

In various embodiments, a value corresponding to each of the stuff byte, the MAC, the data, the write counter, and the result included in the RPMB message corresponding to the authenticated data read request may be "0".

FIG. 23 is a diagram illustrating an example of the RPMB message provided through operation S1811 of FIG. 21.

Referring to FIGS. 1, 2, 21, and 23, the RPMB message corresponding to the authenticated data read response may include the authenticated data and the metadata. The authenticated data may be the MAC generated by the device access controller 210 of the storage device 50. The metadata may include the data read from the RPMB, the nonce, the address, the block count indicating the number of blocks of the read data, and the response message type indicating that the RPMB message is the authenticated data read response.

The nonce may be the nonce included in the RPMB message corresponding to the authenticated data read request transferred through operation S2105, e.g., a value obtained by copying a nonce value generated by the host 400 as is. The address and the block count of the read data may be the same value as the address to be read and the block count indicating the number of blocks of the data to be read included in the RPMB message corresponding to the authenticated data read request. The result may be the result code indicating the performance result of the authenticated data read operation. The response message type may be a predetermined code (e.g., 0400h) indicating that the RPMB message is the authenticated data read response.

The host access controller 410 included in the host 400 may receive the RPMB message including the data read according to the authenticated data read operation, and then operate the MAC using the authentication key included in the host access controller 410 and the metadata included in the RPMB message. Only when the MAC calculated by the host access controller 410 and the MAC generated by the storage device 50 that is the authenticated data included in the RPMB message match, the host access controller 410 may obtain the read data.

As described through FIGS. 10 to 15, in the authenticated data write operation and the authenticated data read operation in the normal RPMB mode, the command PIU for providing the data to be stored or the read data is provided once, but provision of an additional command PIU or the response PIU may be additionally used to transfer the RPMB message. This may cause a delay of a speed of access to the RPMB, complexity of design, or the like.

Figure 24:
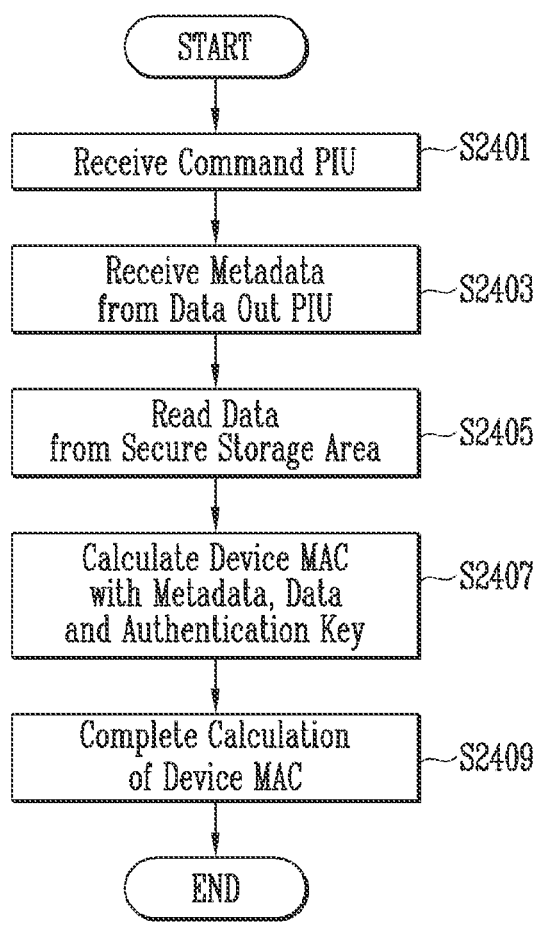
FIG. 24 is a flowchart illustrating an embodiment of a MAC operation process performed during the authenticated data read operation performed in the normal RPMB mode.

FIG. 24 is a flowchart illustrating an embodiment of the MAC operation process performed during the authenticated data read operation performed in the normal RPMB mode.

Referring to FIGS. 1, 2, and 21 to 24, in operation S2401, the storage device 50 may receive the command PIU from the host 400, This may correspond to operation S2101 of FIG. 21. Thereafter, in operation S2403, the storage device 50 may receive the data out PIU from the host 400. This may correspond to operation S2105 of FIG. 21, and the data out PIU received at this time may include the RPMB message as shown in FIG. 22. Therefore, the storage device 50 may receive other metadata in the RPMB from the data out PIU. In operation S2405, the storage device may read the data stored in the secure storage area 110*a*, for example, the RPMB. Thereafter, in operation S2407, the storage device may operate the MAC using the metadata received from the data out PIU, the data read from the RPMB, and the authentication key stored in the RPMB. Such an operation may be started after operation S2105 of FIG. 21. Thereafter, the MAC of which the operation is completed in operation S2409 may be included in the RPMB message of the response PIU in operation S2113 of FIG. 21 and provided to the host 400. The RPMB message at this time may be confirmed through FIG. 23.

Figure 25:
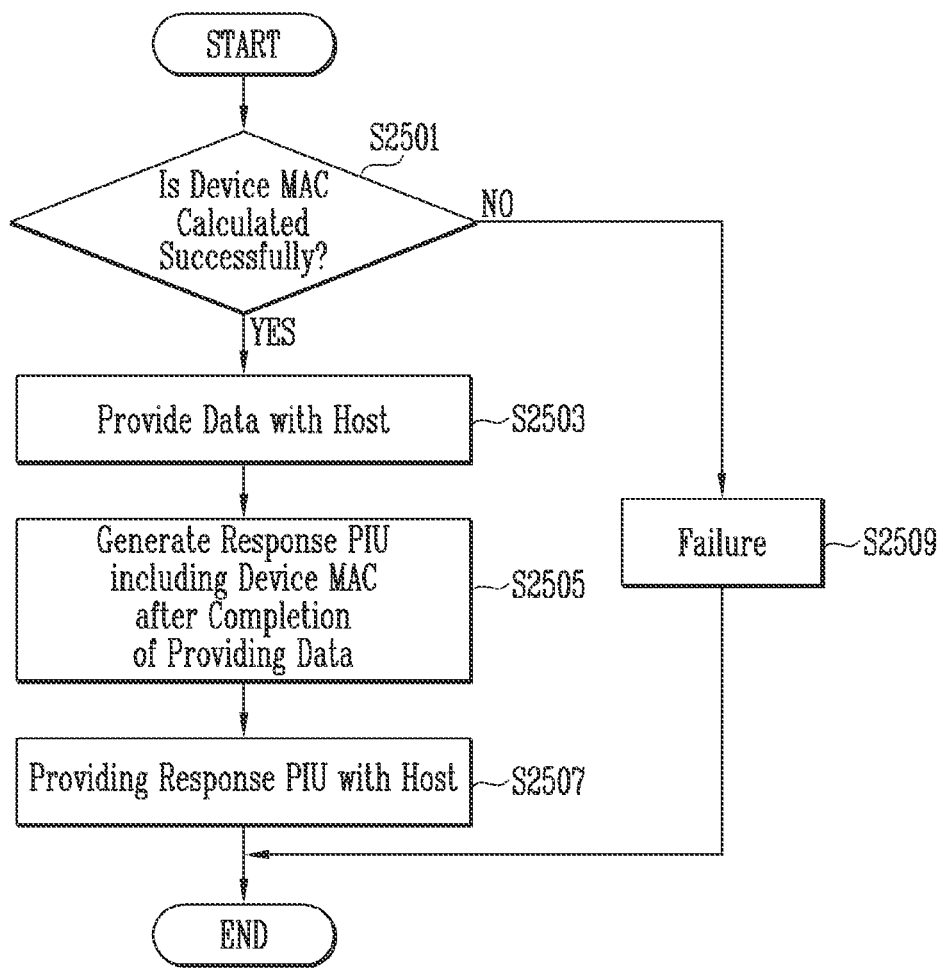
FIG. 25 is a flowchart illustrating an embodiment of an authenticated data read operation using the MAC operated in FIG. 24.

FIG. 25 is a flowchart illustrating an embodiment of the authenticated data read operation using the MAC operated in FIG. 24.

Referring to FIGS. 1, 2 and 21 to 25, in operation S2501, the storage device 50 may check whether the device MAC is successfully operated. When the device MAC is successfully operated, the data read from the secure storage area 110*a*, for example, the RPMB, may be provided to the host 400 in operation S2503. When data provision to the host 400 is completed, the storage device 50 may generate the response PIU including the device MAC in operation S2505, and may provide the response PIU to the host 400 in operation S2507, This may correspond to operation S2113 of FIG. 21, and the RPMB message included in the response PIU may be confirmed through FIG. 23.

Figure 26:
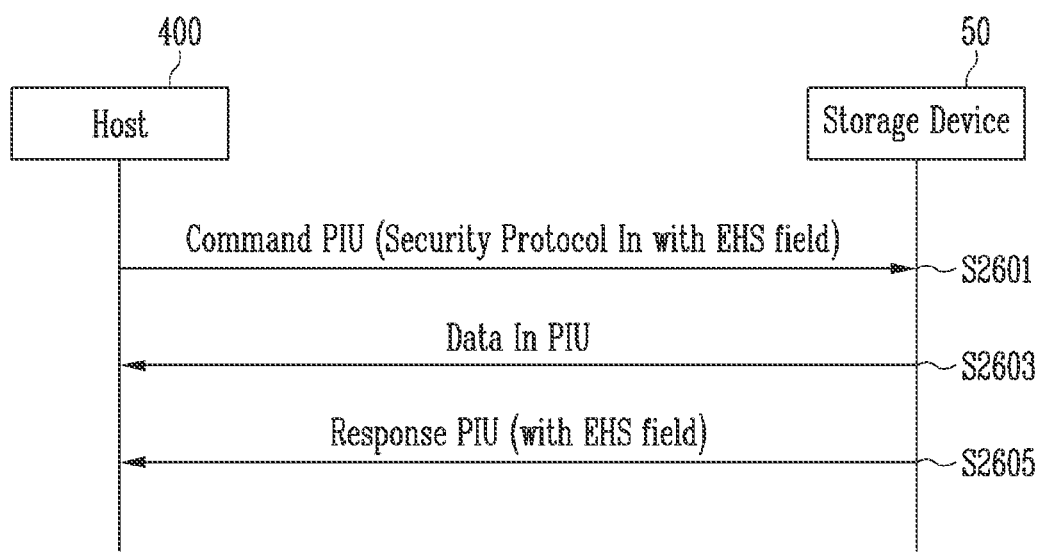
FIG. 26 is a flowchart illustrating an authenticated data read operation performed in an advanced RPMB mode of a storage device according to an embodiment of the present disclosure.

When the device MAC is not successfully operated in operation S2501, the storage device may fail the read request for the secure storage area 110*a*, for example, the RPMB in operation S2509, Accordingly, the read data may not be provided to the host, and an error message may be provided to the host 400, Such an error message may be included in the RPMB message of FIG. 23 in a result code form and provided to the host 400, FIG. 26 is a flowchart illustrating an authenticated data read operation performed in an advanced RPMB mode of a storage device according to an embodiment of the present disclosure.

Referring to FIGS. 1, 2, and 26, in the advanced RPMB mode, the host 400 may transfer the command PIU once to perform the authenticated data read operation, and the storage device 50 may transfer the response PIU once.

For example, in operation S2601, the host 400 may provide the command PIU to the storage device 50, The command PIU may include the RPMB message in the extra header segment. The command PIU may be a security protocol in command indicating that the host 400 requests transferal of data to the storage device 50. An example of the RPMB message transferred in operation S2601 is described with reference to FIG. 27.

In operation S2603, the storage device 50 may read the data stored in the RPMB using the RPMB message included in the command PIU received in operation S2601, and provide the data in PIU including the read data to the host 400. Since the host 400 has already provided the RPMB message to the storage device 50 by including the RPMB message in the extra header segment of the command PIU in operation S2601, the data in PIU transferred in operation S2603 may not include the RPMB message and may include only the data read from the RPMB.

In operation S2605, the storage device 50 may provide the response PIU to the host 400. The response PIU provided by the storage device 50 may include the RPMB message. The RPMB message may be included in the extra head segment of the response PIU. An example of the RPMB message provided by the storage device 50 to the host 400 in operation S2605 is described with reference to FIG. 28.

FIG. 27 is a diagram illustrating an embodiment of a structure of the command PIU transferred in operation S2601 of FIG. 26.

Referring to FIGS. 1, 2, 26, and 27, the command PIU transferred in operation S2601 may be the PIU using the extra header segment, differently from the command PIU transferred in the embodiment described with reference to FIGS. 21 and 25, Therefore, the field indicating the total extra header segment length information included in the basic header segment may be set to a non-zero value (e.g., 02h).

The extra header segment of the command PIU transferred in operation S2601 may include the RPMB message. The RPMB message included in the extra header segment may include some or all of data included in the RPMB message corresponding to the authenticated data read request described with reference to FIG. 22.

For example, the extra header segment of the command PIU may include the authenticated data and the metadata. In an embodiment, the command PIU may include only the metadata without the authenticated data. The metadata may include the nonce generated by the host, the address to be read, the advanced RPMB block count indicating the number of blocks of data to be read (e.g., one block is 4 KB), and 0004h which is the request message type indicating that the RPMB message included in the extra header segment is the authenticated data read request. In an embodiment, the value corresponding to each of the MAC, the write counter, and the result included in the RPMB message included in the extra header segment may be "0".

FIG. 28 is a diagram illustrating an embodiment of the structure of the response PIU transferred in operation S2605 of FIG. 26.

Referring to FIGS. 1, 2, 26, and 28, the response PIU transferred in operation S2605 may be the PIU using the extra header segment differently from the response PIU transferred in the embodiment described with reference to FIGS. 21 to 25. Therefore, the field indicating the total extra header segment length information included in the basic header segment may be set to a non-zero value (02h).

The extra header segment of the response PIU transferred in operation S2605 may include the RPMB message. The RPMB message included in the extra header segment may be the RPMB message corresponding to the authenticated data read response described with reference to FIG. 23. The extra header segment may include the authenticated data and the metadata. The authenticated data may be the MAC generated by the device access controller 210 of the storage device 50. The metadata may include the data read from the RPMB, the nonce, the address, the advanced RPMB block count indicating the number of blocks of the read data, and the response message type indicating that the RPMB message is the authenticated data read response.

The nonce may be the nonce included in the RPMB message corresponding to the authenticated data read request transferred through operation S2601, that is, a value obtained by copying the nonce value generated by the host 400 as is. The address and the block count of the read data may be the same value as the address to be read and the block count indicating the number of blocks of the data to be read included in the RPMB message corresponding to the authenticated data read request. The result may be the result code indicating the performance result of the authenticated data read operation. The response message type may be a predetermined code (e.g., 0400h) indicating that the RPMB message is the authenticated data read response.

The host access controller 410 included in the host 400 may receive the data read according to the authenticated data read operation in operation S2603. In operation S2605, after receiving the RPMB message corresponding to the authenticated data read response, the host access controller 410 may operate the MAC using the authentication key included in the host access controller 410 and the metadata included in the RPMB message. Only when the MAC calculated by the host access controller 410 and the MAC generated by the storage device 50 (which is the authenticated data included in the RPMB message) match, the host access controller 410 may obtain the read data.

According to the embodiment described with reference to FIGS. 26 to 28, in the advanced RPMB mode, since the RPMB message is included in the extra header segment and transmitted, differently from the normal RPMB mode, transmission through the data in PIU or the data out PIU is not required. Therefore, in the advanced RPMB mode, since the number of PIUs to be transmitted is less than that in the normal RPMB mode, the advanced RPMB mode may be a mode in which the RPMB may be accessed at a speed faster than that of the normal RPMB mode.

Figure 29:
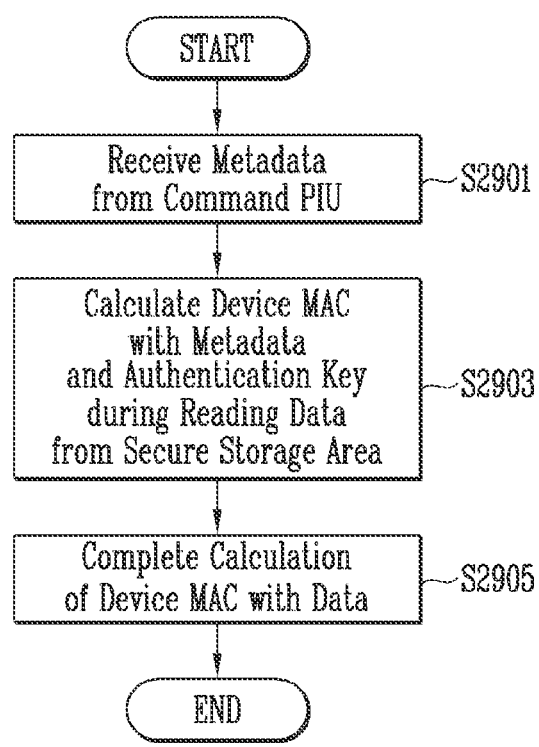
FIG. 29 is a flowchart illustrating a MAC operation process performed during an authenticated data read operation performed in an advanced RPMB mode of a storage device according to an embodiment of the present disclosure.

FIG. 29 is a flowchart illustrating a MAC operation process performed during an authenticated data read operation performed in an advanced RPMB mode of a storage device according to an embodiment of the present disclosure.

Referring to FIGS. 1, 2, and 26 to 29, in operation S2901, the storage device 50 may receive the command PIU from the host 400 and obtain the metadata from the command PIU. This may correspond to operation S2601 of FIG. 26. Thereafter, in operation S2903, the storage device 50 may read the data from the secure storage area 110a, for example, the RPMB, and simultaneously operate the device MAC using the metadata received from the command PIU and the authentication key stored in the RPMB. Such an operation may be performed, for example, before operation S2603 of FIG. 26. The operation of the device MAC may be started before the data is read from the RPMB and may be partially performed during data read, or the operation may be started while the data is read from the RPMB. When the size of the data to be read is large and the data is read by dividing the data a plurality of times, a portion of the device MAC operation may be further performed using data read before the currently read data. The operation of the device MAC may be completed using all data read from the RPMB in operation S2905.

For example, in the case of FIG. 29 showing the MAC operation process according to an embodiment of the present disclosure, differently from FIGS. 21 to 25, metadata for the MAC operation may be obtained faster since the RPMB message is received from the host through the command PIU rather than the data out PIU. In addition, the MAC operation completion time point may be earlier by starting the MAC operation before or during reading data from the RPMB, FIG. 30 is a flowchart illustrating an embodiment of the authenticated data read operation using the MAC operated in FIG. 29.

Referring to FIGS. 1, 2, and 26 to 30, in operation S3001, the storage device 50 may check whether the device MAC is successfully operated. When the device MAC is successfully operated, the data read from the secure storage area 110a (e.g., the RPMB) may be provided to the host 400 in operation S3003, and at the same time, the storage device 50 may generate the response PIU including the device MAC. Thereafter, the response PIU may be provided to the host 400 in operation S3005. This may correspond to operation S2605 of FIG. 26, and the response PIU may be confirmed through FIG. 28.

When the device MAC is not successfully operated in operation S3001, the storage device may fail the read request for the secure storage area 110a, for example, the RPMB in operation S3007. Accordingly, the read data may not be provided to the host, and an error message may be provided to the host 400, In one embodiment, such an error message may be included in a result code form of the RPMB message included in the response PIU of FIG. 28 and provided to the host 400.

Figure 30:
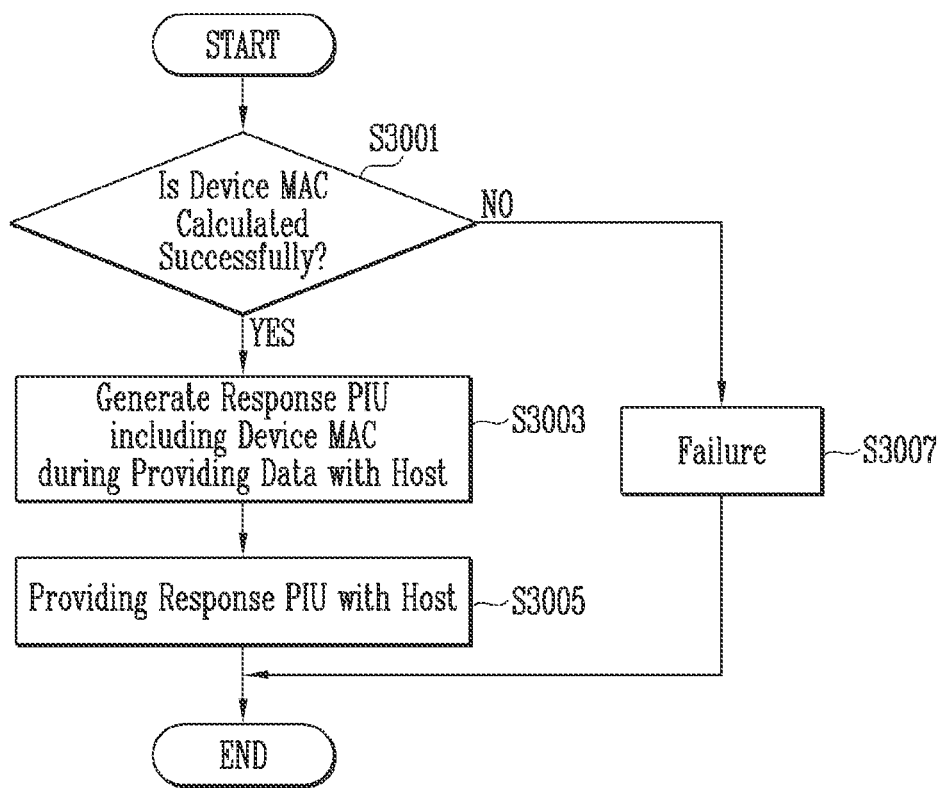
FIG. 30 is a flowchart illustrating an embodiment of an authenticated data read operation using the MAC operated in FIG. 29.

For example, in the case of FIG. 30 showing a process of the authenticated data read operation according to an embodiment of the present disclosure, differently from FIGS. 21 to 25, the completion time point of the authenticated data write operation may be earlier since generation of the device MAC and generation of the response PIU are performed together with data provision to the host 400.

Figure 31:
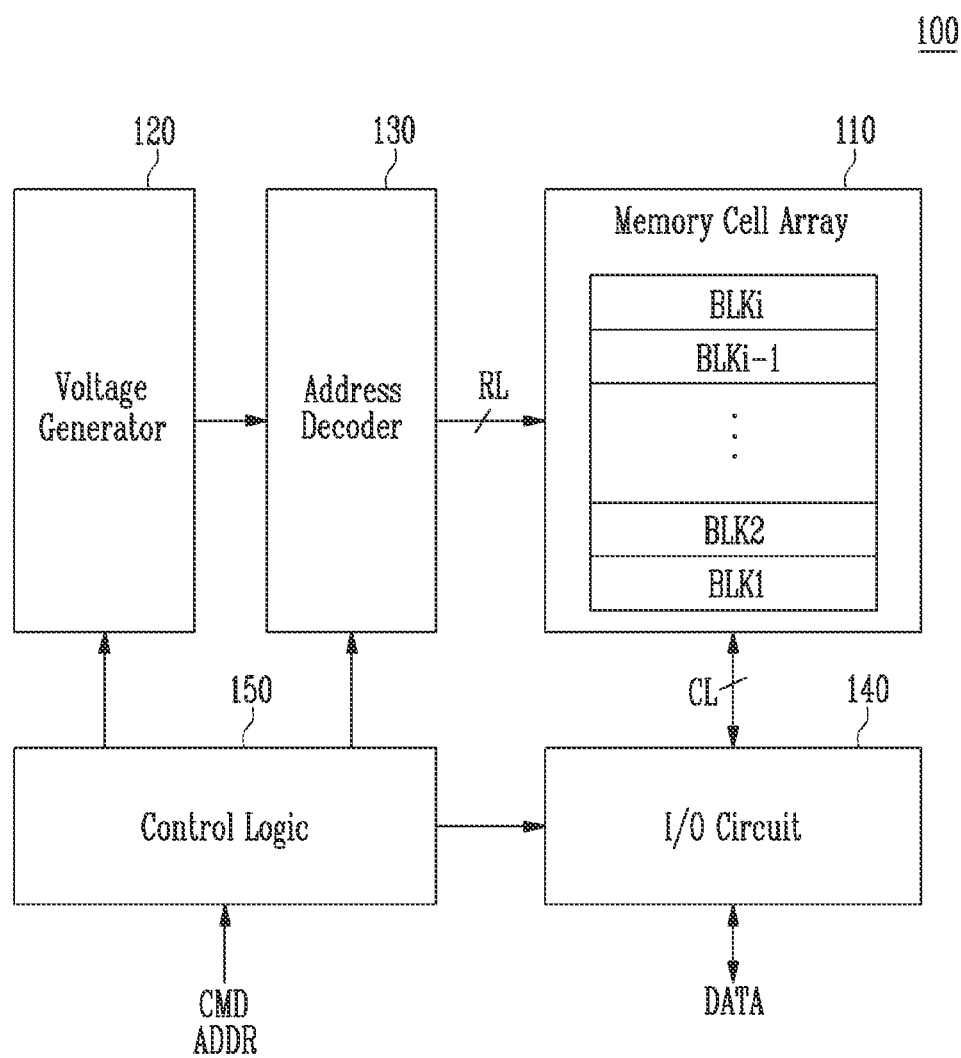
FIG. 31 is a diagram illustrating an embodiment of a memory device of FIG.

FIG. 31 is a diagram illustrating an embodiment of the memory device 100 of FIG. 1. Referring to FIG. 31, the memory device 100 may include a memory cell array 110, a voltage generator 120, an address decoder 130, an input/output circuit 140, and a control logic 150.

The memory cell array 110 includes a plurality of memory blocks BLK1 to BLKi connected to the address decoder 130 through row lines RL. The memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the memory blocks BLK1 to BLKi includes a plurality of memory cells. In an embodiment, the memory cells may be nonvolatile memory cells. Memory cells connected to the same word line among the plurality of memory cells may be defined as one physical page. The memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

A portion of the memory blocks BLK1 to BLKi may be the secure storage area 110a described with reference to FIG. 1. The remaining portion may be the normal storage area 110b. In an embodiment, the secure storage area 110a may be the RPMB.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the program operation, the read operation, and the erase operation.

The voltage generator 120 is configured to generate a plurality of operation voltages using an external power voltage supplied to the memory device 100. The voltage generator 120 operates in response to the control of the control logic 150.

In an embodiment, the voltage generator 120 may generate an internal power voltage by regulating the external power voltage. The internal power voltage generated by the voltage generator 120 may be used as an operation voltage of the memory device 100.

In an embodiment, the voltage generator 120 may generate the plurality of operation voltages using an external power voltage or an internal power voltage. The voltage generator 120 may be configured to generate various voltages for use in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels. The voltage generator 120 may generate the plurality of operation voltages by selectively activating the pumping capacitors in response to the control of the control logic 150. The generated operation voltages may be supplied to the memory cell array 110 by the address decoder 130.

The address decoder 130 is connected to the memory cell array 110 through the row lines RL and is configured to operate in response to control of the control logic 150. The address decoder 130 may receive an address ADDR from the control logic 150 and may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address. For example, the address decoder 130 may include components such as a row decoder, a column decoder, and an address buffer.

The input/output circuit 140 may include a plurality of page buffers. The page buffers may be connected to the memory cell array 110 through the bit lines. During the program operation, data may be stored in selected memory cells according to data stored in the page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate control signals in response to the command CMD and the address ADDR to control the peripheral circuits.

Figure 32:
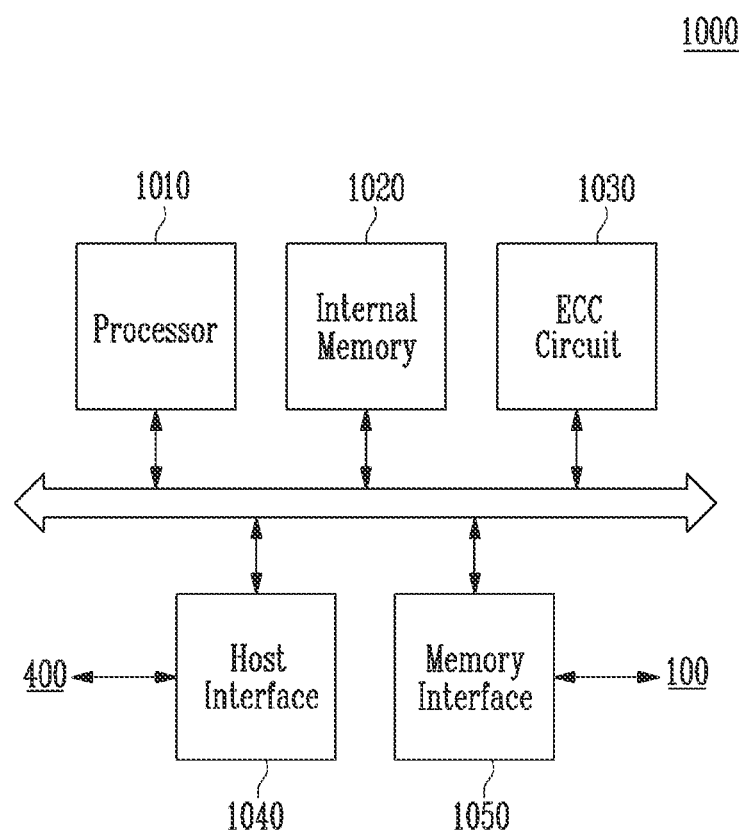
FIG. 32 is a diagram illustrating an embodiment of a memory controller of FIG. 1.

FIG. 32 is a diagram illustrating an embodiment of the memory controller of FIG. 1, Referring to FIG. 32, the memory controller 1000 may include a processor 1010, an internal memory 1020, an error correction code circuit 1030, a host interface 1040, and a memory interface 1050.

The processor 1010 may perform various operations or may generate various commands for controlling the memory device 100. When receiving a request from the host 400, the processor 1010 may generate a command according to the received request and transmit the generated command to a queue controller. In addition, the processor 1010 may perform an authentication operation for access to a secure storage area or generate information for the authentication operation by operating an authentication code or comparing the authentication code. In addition, the processor 1010 may access the secure storage area in the memory device 100 according to the request from the host 400.

The internal memory 1020 may store various pieces of information for an operation of the memory controller 1000. For example, the internal memory 1020 may include logical and physical address map tables. For example, the internal memory 1020 may be configured of at least one of a random access memory (RAM), a dynamic RAM (DRAM), a static RAM (SRAM), a cache, and a tightly coupled memory (TCM). In an embodiment, device access mode information may be stored in the internal memory 1020 (but is not limited thereto), and may be stored in a separate memory different from the memory controller 1000.

The error correction code circuit 1030 is configured to detect and correct an error of data received from the memory device 100 using an error correcting code (ECC). The processor 1010 may adjust a read voltage according to an error detection result of the error correction code circuit 1030 and control the memory device 100 to perform re-reading. In an exemplary embodiment, an error correction block may be provided as a component of the memory controller 1000.

The host interface 1040 may exchange a command, an address, data, and the like between the memory controller 1000 and the host 400. For example, the host interface 1040 may receive a request, an address, data, and the like from the host 400, and may output data read from the memory device 100 to the host 400. The host interface 1040 may communicate with the host 400 using a protocol. Examples of the protocol include universal serial bus (USB), serial AT attachment (SATA), serial attached SCSI (SAS), high speed intership (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), load reduced DIMM (LRDIMM), enhanced small disk interface (ESDI), or integrated drive electronics (IDE).

The memory interface 1050 may exchange a command, an address, and data between the memory controller 1000 and the memory device 100, For example, the memory interface 1050 may transmit the command, the address, and the data to the memory device 100 through a channel, and may receive the data and the like from the memory device 100, The memory interface 1050 may store the data in the secure storage area of the memory device 100 or read the data from the secure storage area according to an instruction of the processor 1010. The memory interface 1050 may be a concept including a buffer memory interface. The buffer memory interface may transmit data between the processor 1010 and the buffer memory. The buffer memory may be used as an operation memory or a cache memory of the memory controller 1000, and may store data used in the storage device 50. By the processor 1010, the buffer memory interface may use the buffer memory as a read buffer, a write buffer, a map buffer, and the like.

According to an embodiment, the buffer memory may include a double data rate synchronous dynamic random access memory (DDR SDRAM), DDR4 SDRAM, low power double data rate4 (LPDDR4) SDRAM, graphics double data rate (DDDR) SDRAM, low power DDR (LPDDR), or Rambus dynamic random access memory (RDRAM). When the buffer memory is included in the memory controller 1000, the buffer memory interface may be omitted.

Figure 33:
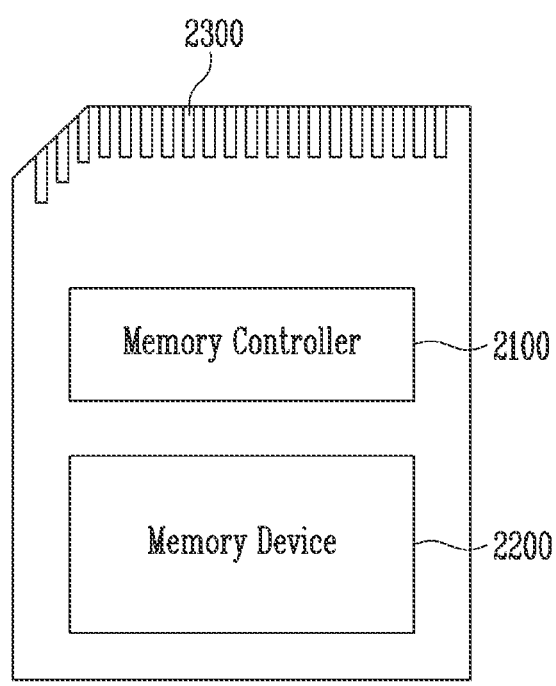
FIG. 33 is a block diagram illustrating a memory card system to which a storage device according to an embodiment of the present disclosure is applied.

FIG. 33 is a block diagram illustrating a memory card system 2000 to which a storage device according to an embodiment of the present disclosure is applied.

Referring to FIG. 33, the memory card system 2000 includes a memory controller 2100, a memory device 2200, and a connector 2300. The memory controller 2100 is connected to the memory device 2200 and is configured to access the memory device 2200. In an embodiment, the memory controller 2100 may access a secure storage area in the memory device 2200. For example, the memory controller 2100 may be configured to control read, program, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented equally to the memory controller 200 described with reference to FIG.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCI-F), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, or an NVMe. For example, the connector 2300 may be defined by at least one of the various communication standards described above. The external device may request the memory controller 2100 to access the secure storage area in the memory device 2200.

For example, the memory device 2200 may be configured of various nonvolatile memory elements. Examples include an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque magnetic RAM (STT-MRAM). The memory device 2200 may include a secure storage area, which is an area in the memory device to which access is limited, such as accessed only through a predetermined special command or authentication, and a normal storage area, which is an area that may be accessed without a separate limitation.

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 34:
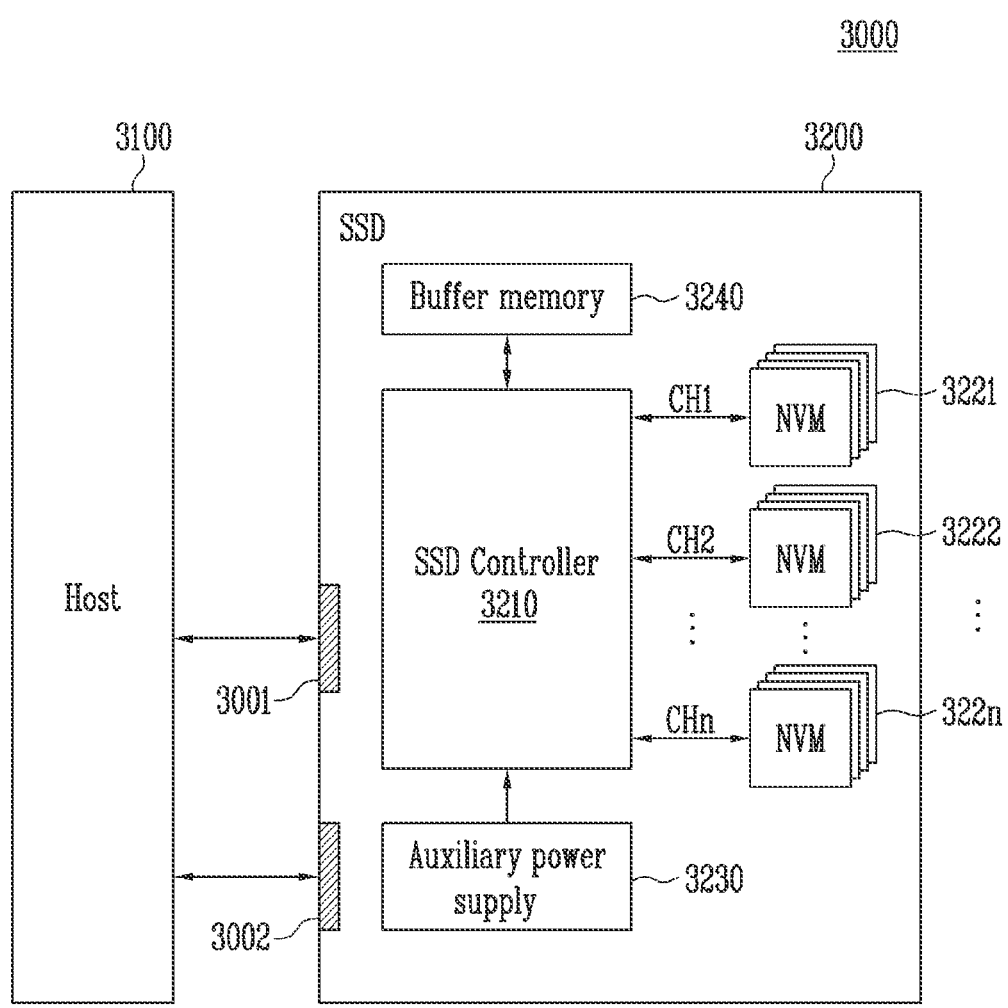
FIG. 34 is a block diagram illustrating a solid state drive (SSD) system to which a storage device according to an embodiment of the present disclosure is applied.

FIG. 34 is a block diagram illustrating a solid state drive (SSD) system 3000 to which a storage device according to an embodiment of the present disclosure is applied.

Referring to FIG. 34, the SSD system 3000 includes a host 3100 and an SSD 3200. The SSD 3200 exchanges a signal with the host 3100 through a signal connector 3001 and receives power through a power connector 3002, The SSD 3200 includes an SSD controller 3210, a plurality of flash memories 3221 to 322n, an auxiliary power supply 3230, and a buffer memory 3240.

According to an embodiment of the present disclosure, the SSD controller 3210 may perform the function of the memory controller 200 described with reference to FIG.

The SSD controller 3210 may control the plurality of flash memories 3221 to 322n in response to the signal received from the host 3100. For example, the signal may be signals based on an interface between the host 3100 and the SSD 3200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. The signal may be transmitted and received in a form of various commands, and may be a signal requesting access to a secure storage area positioned in a portion of the plurality of flash memories 3221 to 322n, or a signal which is a response to the request.

The auxiliary power supply 3230 is connected to the host 3100 through the power connector 3002. The auxiliary power supply 3230 may receive the power from the host 3100 and may charge the power. The auxiliary power supply 3230 may provide power of the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory. Examples include a DRAM, an SDRAM, a DDR SDRAM, an LPDDR SDRAM, and a GRAM, or a nonvolatile memory such as an FRAM, a ReRAM, an STT-MRAM, and a PRAM.

Figure 35:
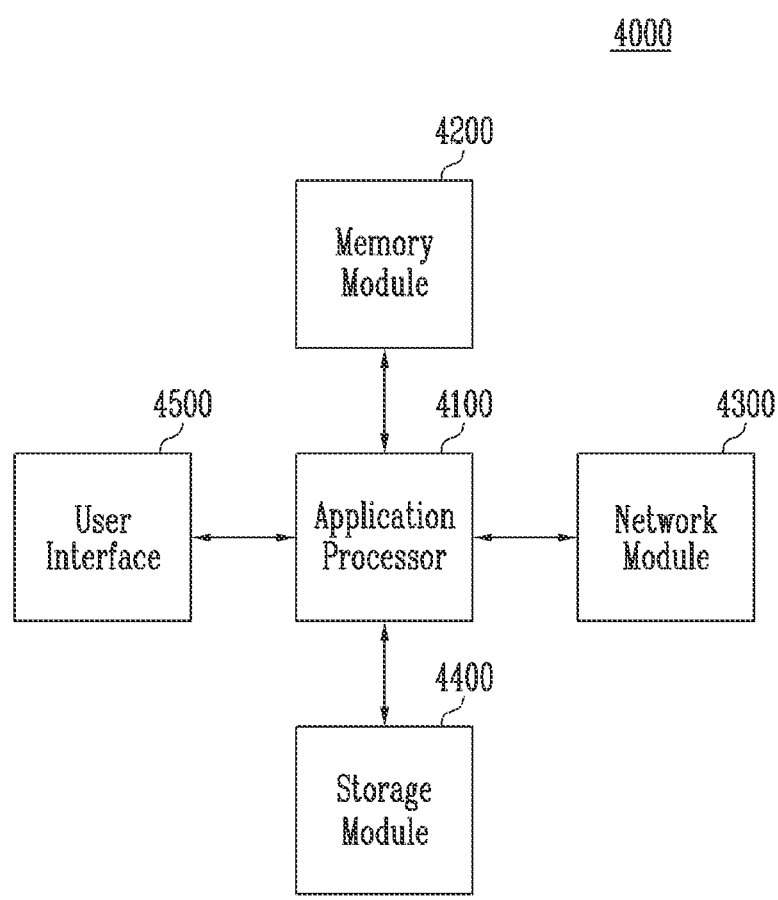
FIG. 35 is a block diagram illustrating a user system to which a storage device according to an embodiment of the present disclosure is applied.

FIG. 35 is a block diagram illustrating a user system 4000 to which the storage device according to an embodiment of the present disclosure is applied.

Referring to FIG. 35, the user system 4000 includes an application processor 4100, a memory module 4200, a network module 4300, a storage module 4400, and a user interface 4500. The application processor 4100 may drive components, an operating system (OS), a user program, or the like included in the user system 4000, For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory. Examples include a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as, but not limited to, code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data, for example, received from the application processor 4100. In one embodiment, the storage module 4400 may transmit data stored in the storage module 4400 to the application processor 4100. For example, the storage module 4400 may be implemented with a nonvolatile semiconductor memory element. Examples include a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices which may operate identically to the memory device 100 described with reference to FIG. 1. For example, a portion of the nonvolatile memory devices may include a secure storage area. The storage module 4400 may operate identically to the storage device 50 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

The methods, processes, and/or operations described herein may be performed by code or instructions to be executed by a computer, processor, controller, or other signal processing device. The computer, processor, controller, or other signal processing device may be those described herein or one in addition to the elements described herein, Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, managers, calculators, comparators, parsers, modules, units, multiplexers, generators, logic, interfaces, decoders, drivers, and other signal generating and signal processing features of the embodiments disclosed herein may be implemented, for example, in non-transitory logic that may include hardware, software, or both. When implemented at least partially in hardware, the controllers, processors, devices, modules, units, multiplexers, managers, calculators, comparators, parsers, generators, logic, interfaces, decoders, drivers, generators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, managers, calculators, comparators, parsers, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The present disclosure described above is not limited to the afore mentioned embodiment and the accompanying drawings, and it will be obvious to those skilled in the art to which the present disclosure pertains that various replacements, modifications, and changes can be made without departing from the technical scope of the present disclosure. The embodiments may be combined to fog additional embodiments.

What is claimed is:

1. A memory controller to control a memory device including a secure storage area, the memory controller comprising:
   a host interface configured to receive a command and data segments from a host, the command including information for authentication requesting access to the secure storage area;
   a processor configured to generate a device authentication code based on the information for the authentication; and
   a memory interface configured to access the secure storage area under control of the processor,
   wherein the processor is configured to repeat at least a portion of an operation of generating the device authentication code whenever receiving an individual data segment among the data segments while the host interface or the memory interface receives the data segments, following the command.

2. The memory controller of claim 1, wherein the secure storage area includes an area accessed when the memory controller receives a predetermined command or passes authentication performed by the memory controller.

3. The memory controller of claim 1, wherein the command comprises:
   a common segment commonly included in commands transmitted and received between the host and the memory controller;
   a unique field including a unique value according to a type of the commands; and
   an extra segment that is a segment other than the common segment.

4. The memory controller of claim 3, wherein the extra segment includes information for the authentication.

5. The memory controller of claim 4, wherein the common segment includes information indicating a length of the extra segment.

6. The memory controller of claim 5, wherein the information indicating the length of the extra segment includes a non-zero value.

7. The memory controller of claim 1, wherein the processor is configured to perform the operation of the device authentication code using an authentication key stored in the secure storage area.

8. The memory controller of claim 7, wherein the processor is configured to complete the operation of the device authentication code using the information for the authentication, the authentication key, and the data segments.

9. A storage device comprising:
   a memory device including a secure storage area accessed according to authentication; and
   a memory controller configured to receive a command requesting to store data segments in the secure storage area and a command including the data segments to be stored in the secure storage area from a host,
   wherein the command requesting to store the data segments in the secure storage area includes information for the authentication, and
   wherein the memory controller is configured to repeat at least a portion of an operation of generating a device authentication code based on the information for the authentication whenever receiving an individual data segment among the data segments while receiving the command including the data segments.

10. The storage device of claim 9,
    wherein the secure storage area includes an authentication key, and
    wherein the memory controller is configured to complete the operation of the device authentication code using the information for the authentication, the authentication key, and the data segments.

11. The storage device of claim 10, wherein the command requesting to store the data segments in the secure storage area includes a host authentication code operated by the host.

12. The storage device of claim 11, wherein the memory controller is configured to compare the device authentication code of which the operation is completed with the host authentication code.

13. The storage device of claim 12, wherein the memory controller is configured to control storage of the data segments in the secure storage area when the device authentication code and the host authentication code match.

14. The storage device of claim 13, wherein an operation of a response authentication code to be provided to the host is performed while the data segments are stored in the secure storage area.

15. The storage device of claim 14, wherein the memory controller is configured to provide a response including the response authentication code to the host after storage of the data segments in the secure storage area is completed.

16. A storage device comprising:
    a memory device including a secure storage area to store data segments accessed according to authentication; and
    a memory controller configured to receive a command requesting to read data segments stored in the secure storage area from a host and read the data segments from the secure storage area in response to the command,
    wherein the command includes information for the authentication, and
    wherein the memory controller is configured to repeat at least a portion of an operation of generating a device authentication code based on the information for the authentication whenever an individual data segment among the data segments is read while the data segments are read.

17. The storage device of claim 16,
wherein the secure storage area includes an authentication key, and
wherein the memory controller is configured to complete the operation of the device authentication code using the information for the authentication, the authentication key, and the data segments.

18. The storage device of claim 17, wherein the memory controller is configured to provide the data segments to the host when the operation of the device authentication code is completed.

19. The storage device of claim 18, wherein the memory controller is configured to generate a response including the device authentication code while providing the data segments to the host.

20. The storage device of claim 19, wherein the memory controller is configured to provide the response to the host after completing a provision of the data segments to the host.

* * * * *